(12) United States Patent
Choi et al.

(10) Patent No.: US 11,277,272 B2
(45) Date of Patent: Mar. 15, 2022

(54) INTEGRATED CIRCUIT AND METHOD FOR CHALLENGE-RESPONSE PHYSICALLY UNCLONABLE FUNCTION

(71) Applicant: SAMSUNG ELECTRONICS CO., LTD., Suwon-si (KR)

(72) Inventors: Yunhyeok Choi, Suwon-si (KR); Yongki Lee, Suwon-si (KR); Yongsoo Kim, Suwon-si (KR); Jieun Park, Suwon-si (KR); Bohdan Karpinskyy, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 16/567,751

(22) Filed: Sep. 11, 2019

(65) Prior Publication Data

US 2020/0145235 A1 May 7, 2020

(30) Foreign Application Priority Data

Nov. 7, 2018 (KR) .................. 10-2018-0136043
Apr. 17, 2019 (KR) .................. 10-2019-0045135

(51) Int. Cl.
*H04L 9/00* (2006.01)
*H04L 9/32* (2006.01)
*H04L 9/08* (2006.01)

(52) U.S. Cl.
CPC ........ *H04L 9/3278* (2013.01); *H04L 2209/08* (2013.01); *H04L 2209/805* (2013.01)

(58) Field of Classification Search
CPC .............. H04L 9/3278; H04L 2209/08; H04L 2209/805
See application file for complete search history.

(56) References Cited

U.S. PATENT DOCUMENTS

| | | | |
|---|---|---|---|
| 6,392,588 B1* | 5/2002 | Levanon | G01S 13/288 342/189 |
| 8,683,210 B2 | 3/2014 | Devadas | |
| 9,252,960 B2 | 2/2016 | Schrijen et al. | |
| 9,948,484 B2 | 4/2018 | Wang et al. | |
| 10,855,476 B2* | 12/2020 | Dafali | H04L 9/0866 |
| 2006/0210082 A1* | 9/2006 | Devadas | G06F 21/31 380/277 |
| 2013/0093502 A1* | 4/2013 | Kim | H03K 19/17768 327/525 |
| 2015/0012737 A1* | 1/2015 | Newell | G06F 21/575 713/2 |
| 2015/0058928 A1 | 2/2015 | Guo et al. | |
| 2015/0188718 A1 | 7/2015 | Falk | |

(Continued)

*Primary Examiner* — Gary S Gracia
(74) *Attorney, Agent, or Firm* — F. Chau & Associates, LLC

(57) ABSTRACT

Systems and methods are described based on an integrated circuit that performs a challenge-response physically unclonable function (PUF). The PUF is used for challenge-response authentication. The integrated circuit includes a PUF block configured to output an n-bit internal response corresponding to a challenge that requests a response where n is an integer greater than 1 and a response generator configured to calculate a Hamming weight of the internal response and output the response by comparing the Hamming weight with at least one reference.

18 Claims, 17 Drawing Sheets

(56) References Cited

U.S. PATENT DOCUMENTS

| | | | |
|---|---|---|---|
| 2015/0264570 A1* | 9/2015 | Vaudenay | H04L 9/3271 726/7 |
| 2015/0318999 A1* | 11/2015 | Falk | G06F 21/44 713/189 |
| 2015/0319000 A1* | 11/2015 | Falk | H04L 9/0866 713/189 |
| 2016/0156476 A1* | 6/2016 | Lee | H04L 9/088 380/44 |
| 2017/0324403 A1* | 11/2017 | Nicolai | H03K 5/06 |
| 2017/0324409 A1 | 11/2017 | Martinez et al. | |
| 2017/0359165 A1* | 12/2017 | Liu | H04L 9/004 |
| 2018/0006813 A1* | 1/2018 | Van Der Leest | H04L 9/0869 |
| 2018/0091293 A1* | 3/2018 | Suresh | H04L 9/002 |
| 2018/0102155 A1* | 4/2018 | Tang | H04L 9/0866 |
| 2018/0167205 A1 | 6/2018 | Moriyama | |
| 2018/0183613 A1* | 6/2018 | Dafali | H04L 9/3278 |
| 2018/0191353 A1 | 7/2018 | Su et al. | |
| 2018/0198447 A1* | 7/2018 | Rice | H03K 19/003 |
| 2018/0241557 A1* | 8/2018 | Maes | H04L 9/0866 |
| 2020/0145235 A1* | 5/2020 | Choi | H04L 9/3278 |
| 2021/0234709 A1* | 7/2021 | Kim | H04L 9/0866 |

\* cited by examiner

INTEGRATED CIRCUIT AND METHOD FOR CHALLENGE-RESPONSE PHYSICALLY UNCLONABLE FUNCTION

CROSS-REFERENCE TO RELATED APPLICATIONS

This application claims the benefit of Korean Patent Application Nos. 10-2018-0136043 and 10-2019-0045135, respectively filed on Nov. 7, 2018 and Apr. 17, 2019, in the Korean Intellectual Property Office, the disclosures of which are incorporated by reference herein in their entirety.

BACKGROUND

Computer security, cybersecurity, and information technology security refer to computer system protection methods to prevent theft and damage to hardware, software, or any type of electronic data. Various techniques have been used to achieve computer security. For example, challenge-response authentication functions provide a challenge to an object or apparatus which will then be required to provide an authentication response prior to gaining access to a computer system. Password authentication is an example of a challenge-response authentication function where the challenge part of the function is asking for the password, and the response is the correct password.

As demand for computer security increases, the need for functions that provide secure means of authentication also increases.

SUMMARY

The inventive concept relates to an integrated circuit for a challenge-response physically unclonable function (PUF) and a method of using the integrated circuit, and more particularly, to an integrated circuit which provides a structure in which the PUF is used for challenge-response authentication and a method of using the integrated circuit.

According to an aspect of the inventive concept, an integrated circuit for a challenge-response physically unclonable function (PUF) includes a PUF block configured to output an internal response corresponding to a challenge that requests the response, wherein the response comprises n bits where n is an integer greater than 1; and a response generator configured to compare a Hamming weight of the internal response and output the response by comparing the Hamming weight with at least one reference.

According to another aspect of the inventive concept, an integrated circuit for a challenge-response physically unclonable function (PUF), the integrated circuit includes: a PUF block configured to output an internal response that has n bits and varies according to a challenge that requests a response where n is an integer great than 1; and a response generator configured to output the response based on the internal response by counting a bit unit which has a particular value corresponding to at least one bit and comparing a result of the counting with at least one reference.

According to another aspect of the inventive concept, a challenge-response authentication method using an integrated circuit including a physically unclonable function (PUF) includes: generating a first challenge; providing the first challenge to the integrated circuit; obtaining, from the integrated circuit, a first response corresponding to the first challenge; and evaluating the first response based on a first Hamming weight of an n-bit first internal response generated by the integrated circuit in response to the first challenge.

According to another aspect of the inventive concept, a method of authentication is described. The method may include receiving a challenge; generating an internal response to the challenge based on a PUF; counting a number of bits in the internal response having a predetermined value; comparing a result of the counting to a first reference value; and generating a response the challenge based at least in part on a result of the comparison.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Embodiments of the present disclosure relate to a physically unclonable function (PUF), and more particularly, to an integrated circuit for a challenge-response PUF and a method of using the integrated circuit.

Computer security and cyber security applications often use a family of protocols, called challenge-response authentication, in which one party presents a question and another party must provide a valid answer to confirm authentication. For example, a popular challenge response protocol is password authorization. In this example, the challenge is the system asking for a password, and the challenge is the user providing a valid password.

A challenge-response authentication process can be more secure by using a PUF, which is a randomly generated physical entity embodied in a physical structure on items such as integrated circuits. A PUF can be understood as a physically defined "digital fingerprint" for an electronic circuit. Thus, a PUF circuit may be configured to produce a random, but repeatable signal in response to an input. For example, the response may be random in the sense that it depends on the random internal structure of the PUF circuit, but repeatable in the sense that the structure remains stable over time.

Figure 1:
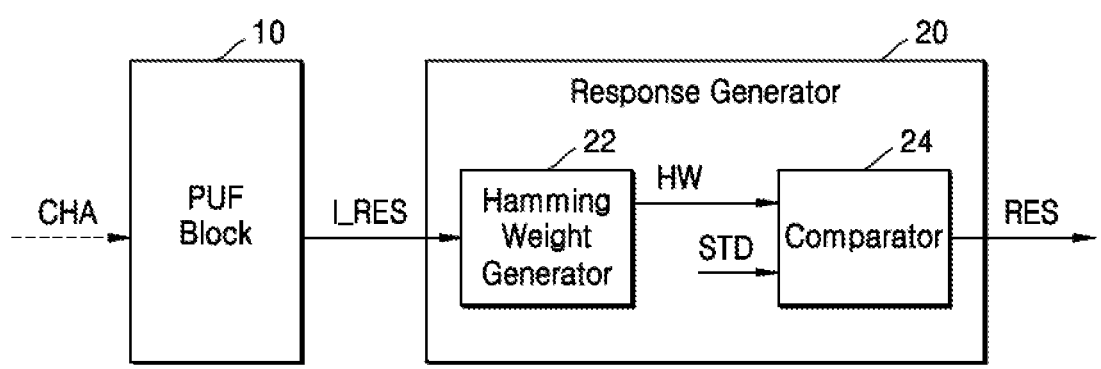
FIG. 1 is a block diagram of an integrated circuit according to an example embodiment of the inventive concept.
Figure 2:
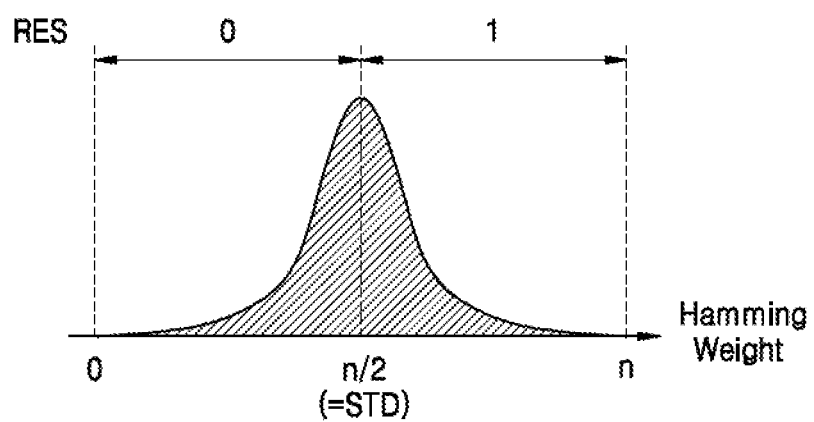
FIG. 2 is a graph showing an example of an operation of a response generator shown in FIG. 1, according to an example embodiment of the inventive concept.

FIG. 1 is a block diagram of an integrated circuit 1 according to an example embodiment of the inventive concept, and FIG. 2 is a graph showing an example of an operation of a response generator 20 shown in FIG. 1, according to an example embodiment of the inventive concept. The integrated circuit 1 may be referred to as an integrated circuit or a device for challenge-response authentication. As shown in FIG. 1, the integrated circuit 1 may generate a response RES corresponding to a challenge CHA. In some embodiments, the integrated circuit 1 may be manufactured using a semiconductor process, and components of the integrated circuit 1 may be packaged in a one or multiple packages.

Referring to FIG. 1, the integrated circuit 1 may include a PUF block 10 and a response generator 20. The PUF block 10 may receive a challenge CHA from outside of the integrated circuit 1. In some embodiments, the PUF block 10 may receive the challenge CHA from another component included in the integrated circuit 1, and receive a signal (e.g., 1_CHA in FIGS. 5A and 5B) that is obtained by processing the challenge CHA. Additionally, the response RES generated by the response generator 20 may be output to the outside of the integrated circuit 1 in some embodiments and may also be provided to another component included in the integrated circuit 1 in some embodiments.

The PUF block 10 may generate an internal response I_RES corresponding to the challenge CHA. The PUT block 10 may include a plurality of PUF source circuits (for example, a first PUF source circuit 54a_1 in FIG. 5A). The PUF source circuit may generate a signal having a unique value according to tire PUF and may be referred to as a PUF cell in the present specification.

The term PUF may refer to providing a unique value corresponding to hardware based on intrinsic properties of the hardware. For example, when pieces of hardware such as semiconductor chips are manufactured by a same process, the pieces of hardware may not be physically identical to each other and slight variations may occur in the pieces of hardware. The unique value of hardware may be extracted based on such variations. The extracted value may be used in an application which uses security applications such as secure communication, secure data process, user identification, firmware update, and the like.

In some embodiments, a PUF source circuit included in the PUF block 10 may have a random micro-structure that generates a bit signal of a unique value. As non-limiting examples, the PUF source circuit may have a static random access memory (SRAM) type PUF structure based on a value stored in an SRAM cell, a ring oscillator structure based on frequency variation, a leakage-based PUF structure based on a leakage current, and the like, or an arbiter PUF structure in which a path of a signal is arbitrarily determined. A PUF source circuit, which is described in more detail with reference to FIG. 5A, may generate a bit signal of a unique value based on differences between threshold levels of logic gates such as a NAND gate, a NOR gate, or an inverter (INV).

The PUF block 10 may generate the internal response IRES based on signals from one or more PUF source circuits as well as one more generated challenges CHA. Therefore the internal response I_RES may be different from an internal response which is generated by a PUF block included in another integrated circuit having a same structure, and receiving the same challenge CHA. In some embodiments, the PUF block 10 may generate an n-bit internal response I_RES (n is an integer greater than 1). For example, the PUF block 10 may include n PUF source circuits, and each PUF source circuit may generate a bit signal corresponding to 1 bit. Examples of the PUF block 10 will be described later with reference to FIGS. 5A, 5B, and 6.

The response generator 20 may receive the internal response I_RES, then generate a response RES from the internal response I_RES. In some embodiments, the response generator 20 may generate a response RES based on a Hamming weight HW of the n-bit internal response I_RES. The Hamming weight MW may refer to the number of symbols different from zero. For example, the Hamming weight HW may refer to a count of the number '1' in a multi-bit signal. Accordingly, the Hamming weight HW of the n-bit internal response I_RES may have a value from 0 to n. As described above, the internal response I_RES generated by the PUF block 10 may be different from the internal response generated in another integrated circuit, and accordingly, the Hamming weights HW of internal responses generated in integrated circuits may have a distribution from zero to n. For example, as shown in FIG. 2, the number of integrated circuits generating internal responses I_RES that have Hamming weights HW of approximately n/2 is relatively great, and the number of integrated circuits generating internal responses I_RES that have Hamming weights HW of approximately 0 or n may be relatively small.

For the challenge-response authentication to be functional, generation of a constant response according to a same challenge may be used. As described above, the response generator 20 may generate the response RES based on the Hamming weight HW of the internal response I_RES, and accordingly, errors that may occur in the PUF block 10 may be prevented from accumulating. For example, at least some of the plurality of PUF source circuits included in the PUF block 10 may generate a bit signal having a constant value. Additionally or alternatively, some of the plurality of PUF source circuits may generate a bit signal that varies based on certain conditions (for example, time, temperature, voltage, and the like). In the present specification, the former may be referred to as a stable PUF source circuit, and the latter may be referred to as an unstable PUF source circuit. When a plurality of bit signals output by the plurality of PUF source signals are merged by a logical operation (for example, AND, OR, and the like) to generate the response RES, errors may occur due to the unstable PUF source circuits. That is, errors of the unstable PUF source circuits may be accumulated in the response RES. The Hamming weight HW may be used by the response generator 20 for generating the response RES to prevent the accumulation of errors based on the unstable PUF source circuits. Thus, a consistent result RES may be generated for the challenge CHA.

A plurality of pairs of challenge-response may be used for security of the challenge-response authentication. If the number of challenge-response pairs is limited to a few pairs, the challenge-response authentication may be vulnerable to certain kinds of cyber-attacks.

Thus, according to certain embodiments of the present inventive concept, a large number of pairs of challenge-response may be used. For example, the number challenge-response pairs may increase exponentially (e.g., in proportion to $2^n$). Since the response generator 20 may efficiently generate the response RES based on the Hamming weight HW of the internal response I_RES, the number of challenge-response pairs may be increased without sacrificing computational efficiency.

Referring to FIG. 1, the response generator 20 may include a Hamming weight generator 22 and a comparator 24. The Hamming weight generator 22 may receive the internal response I_RES, generate a Hamming weight HW of the internal response I_RES, and provide the Hamming weight HW to the comparator 24. In some embodiments, the Hamming weight generator 22 may sum bits of the internal responses I_RES to generate the Hamming weight HW. Examples of the Hamming weight generator 22 will be described later with reference to FIGS. 7 through 10.

The comparator 24 may receive the Hamming weight HW from the Hamming weight generator 22 and receive at least one reference STD. The comparator 24 may compare the Hamming weight HW with the at least one reference STD and generate the response RES based on a result of the comparison. For example, as shown in FIG. 2, the at least one reference STD may have a value of n/2. The comparator 24 may generate a response RES of a first value, for example, '0', when die Hamming weight HW is less than or equal to n/2 and generate a response RES of a second value, for example, '1', when the Hamming weight HW is great than or equal to n/2. In some embodiments, a distribution of the Hamming weight HW may have a peak at a value other than n/2 according to properties of the PUF source circuits included in the PUF block 10. In this case, die comparator 24 may compare the at least one reference STD that has a value corresponding to the peak with the Hamming weight HW. Other examples of the comparator 24 will be described later with reference to FIGS. 3 and 4.

In some embodiments, the response generator 20 may count the number of bit strings that have a particular value of multi-bit in the internal response I_RES and may generate the response RES by comparing a result of the counting with a probabilistic expected value of the particular value. For example, the response generator 20 may count the number of bit strings of 2 bits having a value of '01' in the internal response I_RES. When the internal response I_RES is n-bit, the number of bit strings of 2 bits in die internal response I_RES may be n/2. Thus, a probabilistic expected value of '01' may be n/8. The response generator 20 may generate the response RES by comparing the result of counting with n/8. Furthermore, in some embodiments, bit strings may include at least one common bit in the internal responses I_RES. Similarly, it will be understood that the response generator 20 may count bit strings of at least three bits and compare a result of the counting with a probabilistic expected value. In the present specification, the bit string includes two or more bits and 1 bit may be collectively referred to as a bit unit.

Thus, according to certain embodiments of the inventive concept, a method of authentication is described in which the integrated circuit 1 receives a challenge, and the PUF block 10 generates an internal response to the challenge based on a PUF. The Hamming weight generator 22 counts a number of bits in the internal response having a predetermined value, the comparator 24 compares a result of the counting to a first reference value, and the response generator 20 generates a response to the challenge based at least in part on a result of the comparison.

Figure 3:
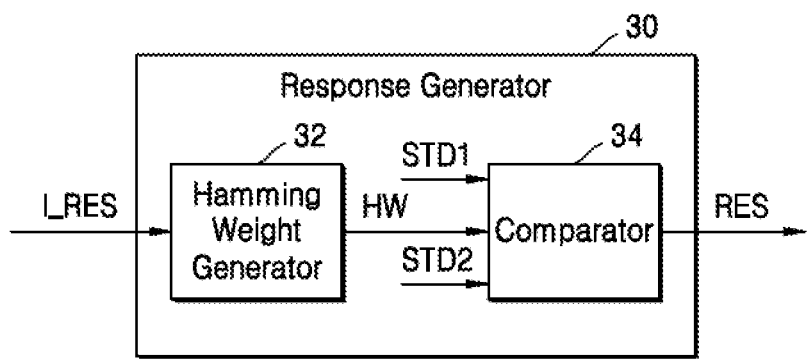
FIG. 3 is a block diagram of a response generator according to an example embodiment of the inventive concept.
Figure 4:
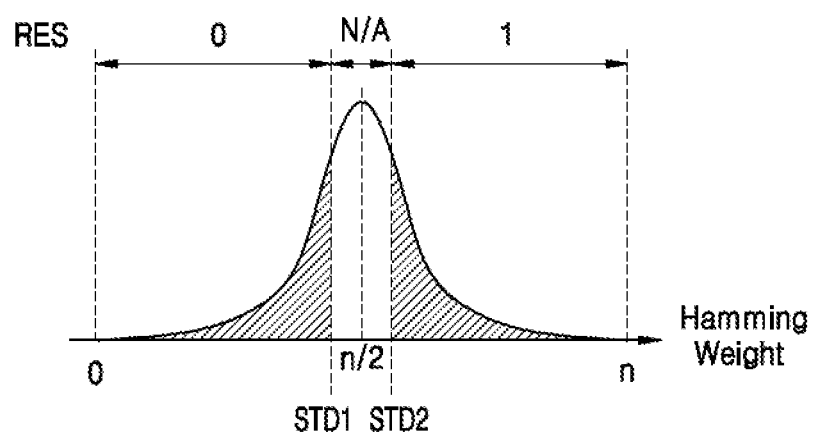
FIG. 4 is a graph showing an example of an operation of a response generator according to an example embodiment of the inventive concept.

FIG. 3 is a block diagram of a response generator 30 according to an example embodiment of the inventive concept, and FIG. 4 is a graph showing an example of an operation of the response generator 30 according to an example embodiment of the inventive concept. As described above with reference to FIG. 1, the response generator 30 of FIG. 3 may generate a response RES based on a Hamming weight HW of an internal response I_RES. As shown in FIG. 3, the response generator 30 may include a Hamming weight generator 32 and a comparator 34. Hereinafter, FIG. 3 will be described with reference to FIG. 1, and repeated descriptions previously given with reference to FIG. 1 are omitted.

The comparator 34 may receive the Hamming weight HW of the internal response I_RES from the Hamming weight generator 32. Additionally, the comparator 34 may receive a first reference STD1 and a second reference STD2 and compare the Hamming weight HW with the first reference STD1 and the second reference STD2. For example, as shown in FIG. 4, the first reference STD1 may be less than n/2, the second reference STD2 may be greater than n/2, and in some embodiments, a sum of the first reference STD1 and the second reference STD2 may be n. As shown in FIG. 4, the comparator 34 may generate a response RES of a first value, for example, '0', when the Hamming weight HW is less than or equal to (or less than) the first reference STD1 and may generate an answer of a second value, for example, '1', when the Hamming weight HW is greater than or equal to the second reference STD2. On the other hand, the comparator 34 may ignore a Hamming weight when the Hamming weight HW is greater than or equal to the first reference STD1 or is less (or is equal to or smaller than) the second reference STD2, for example, the comparator 34 may not generate the response RES or generate a response RES that may be independent from the Hamming weight HW.

In some embodiments, comparing the Hamming weight to one or more reference values may enable the integrated circuit 1 to discard values that are likely the result of an unstable PUF. Ignoring these values may result in more reliable performance of the challenge-response function.

As described above with reference to FIG. 1, the PUF block 10 may include an unstable PUF source circuit, and accordingly, the value of the internal response I_RES may vary. Accordingly, as shown in FIG. 2, errors based on the unstable PUF source circuit may be prevented by determining the value of the response RES based on two or more references. For example, the first reference STD1 and the second reference STD2. For example, when the Hamming weight HW is compared to a single reference that is n/2, according to variation of the bit signals of the unstable PUF source signals, the value of the response RES may vary between '0', and '1'. Likewise, when the Hamming weight HW is compared to the first reference STD1 and the second reference STD2, which may be different from one another, as shown in FIG. 4, the Hamming weight HW in which the unstable PUF source circuits have impact on a value of a response RES may be ignored. Additionally, when the bit signals of the unstable PUF source circuits fluctuate, the value of the response RES may be maintained constant. In some embodiments, the first reference STD1 and the second reference STD2 may be determined based on data accumulated while producing the integrated circuit 1, for example, a rate of the unstable PUF source circuits.

Figure 5A:
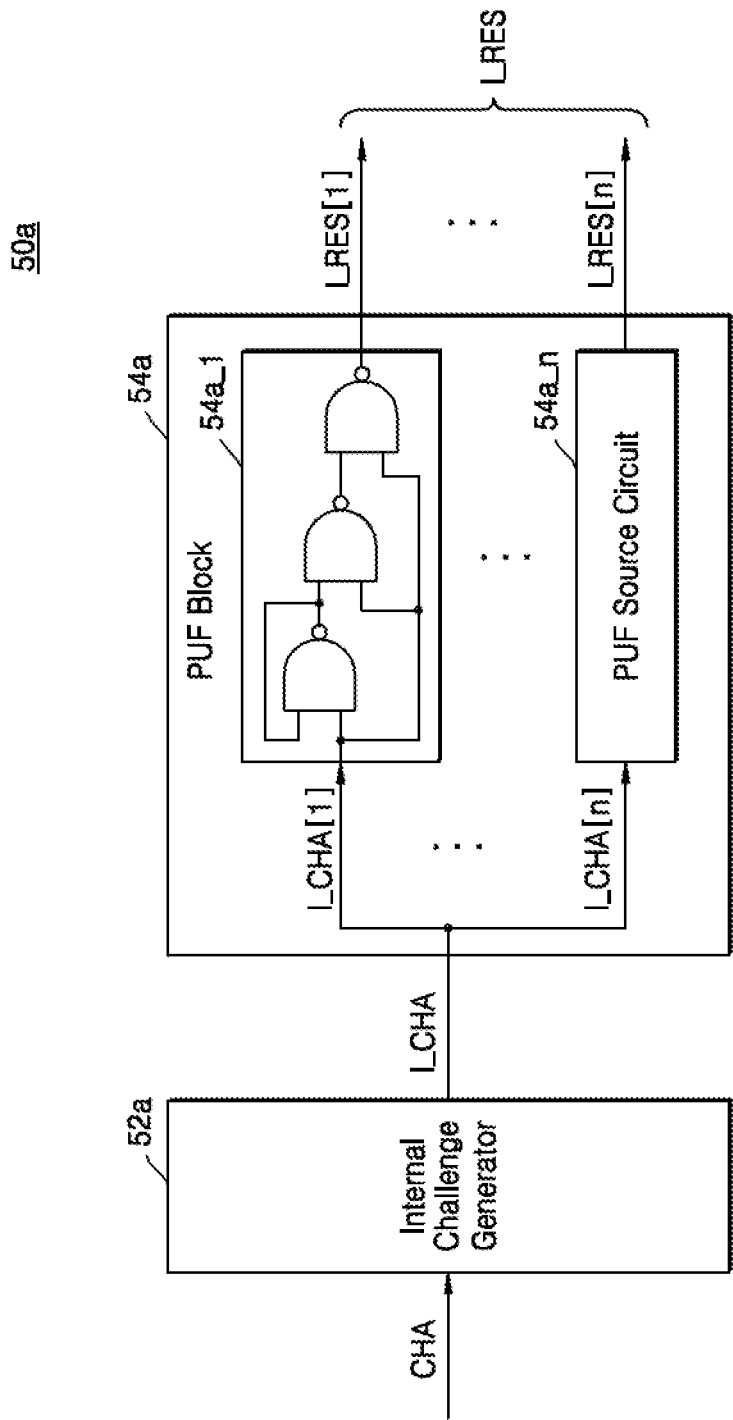
FIGS. 5A and 5B are block diagrams respectively showing examples of an integrated circuit according to example embodiments of the inventive concept.
Figure 5B:
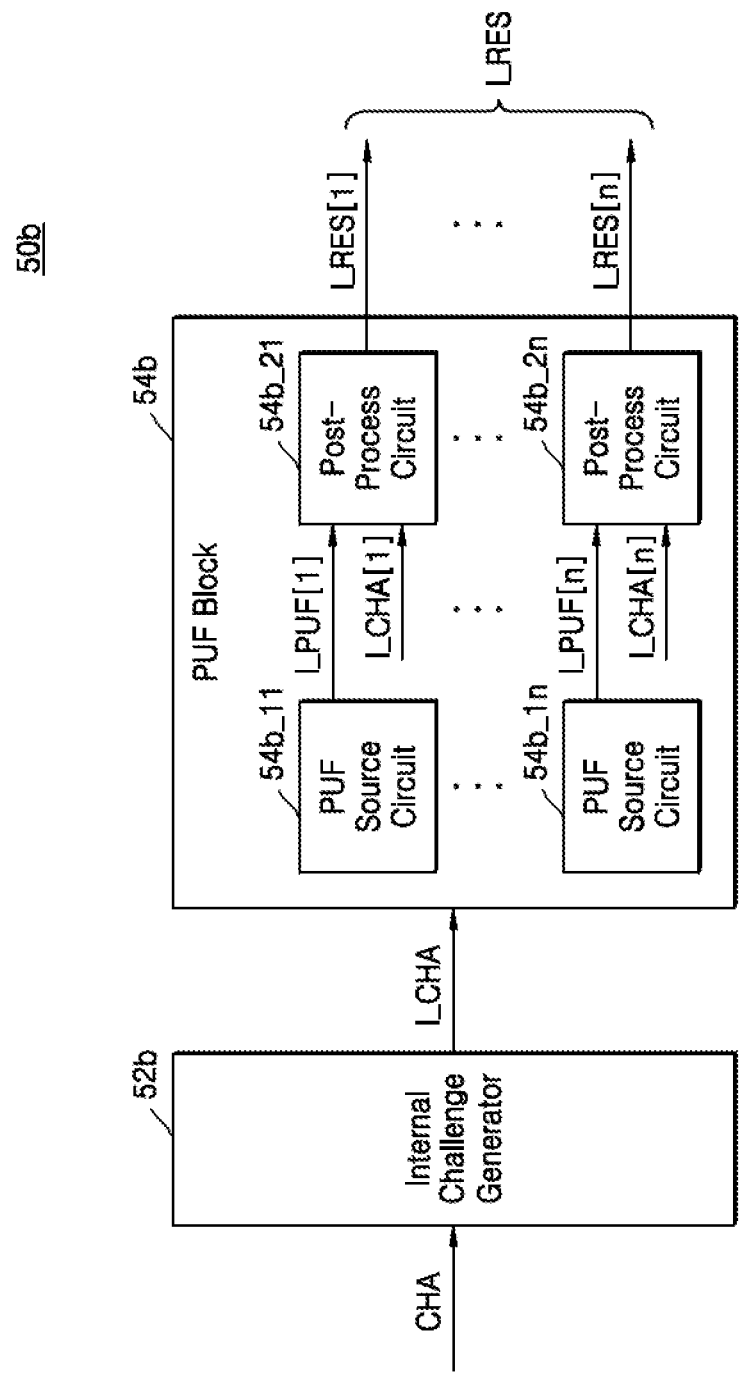

FIGS. 5A and 5B are block diagrams showing examples of integrated circuits 50a and 50b, respectively, according to example embodiments of the inventive concept. More particularly, FIGS. 5A and 5B respectively show integrated circuits 50a and 50b respectively including internal challenge generators 52a and 52b, and show examples of the PUF block 10 of FIG. 1. Hereinafter, FIGS. 5A and 5B will be described with reference to FIG. 1, and from among descriptions of FIG. 5, repeated descriptions will be omitted. Generating an internal challenge may enhance countermeasures to a potential cyber-attack. In some cases, the internal challenge generators 52a and 52b generate an internal challenge using a non-linear function. Additionally or alternatively, the internal challenge may be generated by inverting a portion of the PUF bit signals.

Referring to FIG. 5A, the integrated circuit 50a may include the internal challenge generator 52a and a PUF block 54a. The internal challenge generator 52a may receive a challenge CHA, generate an internal challenge I_CHA from the challenge CHA, and provide the internal challenge I_CHA to the PUF block 54a. In some embodiments, the internal challenge generator 52a may generate an internal challenge I_CHA from the challenge CHA based on a non-linear function. For example, the internal challenge generator 52a may apply a hash function to the challenge CHA to generate the internal challenge I_CHA. Furthermore, in some embodiments, the internal challenge generator 52a may generate an internal challenge I_CHA that is expanded from the challenge CHA. For example, the internal challenge generator 52a may generate an internal challenge I_CHA of n bits from a challenge CHA that is k bits smaller than n bits (k<n).

As the internal challenge I_CHA, which is obtained by applying the non-linear function to the challenge CHA, countermeasure for attacks to the integrated circuit 50a. For example, side-channel attacks (SCA), may be enhanced. In another example, correlation between the challenge CHA and the internal challenge I_CHA used for generating the internal response I_RES may be reduced. Thus, an attack based on linearity, for example, a modeling attack, may be effectively blocked. Additionally, an attacker may not arbitrarily control the internal challenge I_CHA used for generating the internal response I_RES. Thus, increased weight may be given to the analysis difficulty of the integrated circuit 50a, such as increasing the number of times the challenge CHA is provided or decreasing the prediction probability of the response RES.

The PUF block 54a may include first through $n^{th}$ PUF source circuits 54a_1 through 54a_n. Each of the first through $n^{th}$ PUF source circuits 54a_1 through 54a_N may receive a bit of the internal challenge I_CHA and output a bit of the internal response I_RES. For example, the first PUF source circuit 54a_1 may receive a first bit I_CHA[1] of the internal challenge I_CHA and output a first bit I_RES[1] of the internal response I_RES. Additionally, the $n^{th}$ PUF source circuit 54a_n may receive an n*bit 1_CHA[n] of the internal challenge I_CHA and may output an $n^{th}$ bit I_RES [n] of the internal response I_RES. In the present specification, a bit from a multiple bit signal may be referred to as a bit signal.

The first through $n^{th}$ PUF source circuits 54a_1 through 54a_n may each generate a bit signal having a unique value based on threshold levels of logic gates, that is, levels for distinguishing '0' and '1' from each other. For example, as shown in FIG. 5A, the first PUF source circuit 54a_1 may include a plurality of NAND gates and generate the bit signal I_RES[1] based on the difference between threshold levels of the NAND gates. Additionally, the first PUF source circuit 54a_1 may generate the bit signal I_RES[1] based on a bit I_CHA[1] of the internal challenge I_CHA. For example, as shown in FIG. 5A, when a bit I_ICHA[1] of the internal challenge I_CHA is '1', a bit signal I_RES[1] having a value according to the difference between threshold levels of the NAND gates may be generated. On the other hand, when the bit I_CHA[1] of the internal challenge I_CHA is '0', the bit signal I_RES[1] may have a constant value of '1'. Accordingly, the value of the bit signal I_RES [1] may vary according to the difference between the threshold levels of the NAND gates and to the bit I_CHA[1] of the internal challenge I_CHA. In some embodiments, a PUF source circuit may also include a logic gate that may perform an inverting function, for example, a NOR gate, an inverter INV, and the like.

Referring to FIG. 5B, the integrated circuit 50b may include the internal challenge generator 52b and the PUF block 54. Similarly to the internal challenge generator 52a in FIG. 5A, the internal challenge generator 52b may generate an internal challenge I_CHA from a challenge CHA and provide the internal challenge I_CHA of n bits to the PUF block 54b. The PUF block 54b may include first through $n^{th}$ PUF source circuits 54b_11 through 54b_1n and first through $n^{th}$ post-processing circuits 54b_21 through 54b_2n. Unlike the first through $n^{th}$ PUF source circuits 54a_1 through 54a_n in FIG. 5A, the first through $n^{th}$ PUF source circuits 54b_11 through 54b_1n may generate bit signals I_PUF[1] through I_PUF[n] having unique values independent from the internal challenge I_CHA.

The first through $n^{th}$ post-processing circuits 54b_21 through 54b_2n may generate the internal response I_RES by processing the bit signals I_PUF[1] through I_PUF[n] of unique values generated by the first through $n^{th}$ PUF source circuits 54b_11 through 54b_1n and the internal challenge I_CHA. For example, the first post-processing circuit 54b_21 may generate a first bit I_RES[1] of the internal response I_RES by arbitrarily processing the bit signal I_PUF[1] generated by the first PUF source circuit 54b_11 and the first bit I_CHA[1] of the internal challenge I_CHA. Additionally, the $n^{th}$ post-processing circuit 54_2n may generate an $n^{th}$ bit I_RES[n] of the internal response I_RES by arbitrarily processing the bit signal I_PUF[n] generated by the $n^{th}$ PUF source circuit 54b_1n and an $n^{th}$ bit I_CHA [n] of the internal challenge I_CHA. Accordingly, the internal response I_RES may be dependent on the bit signals I_PUF[1] through I_PUF[n] of unique values generated by the first through $n^{th}$ PUF source circuits 54b_11 through 54b_1n and also on the internal challenge I_CHA.

In some embodiments, the first through $n^{th}$ post-processing circuits 54b_21 through 54b_2n may each include at least one logic gate. For example, the first post-processing circuit 54b_21 may include an XOR gate and may generate the first bit I_RES[1] of the internal response I_RES by performing an XOR operation on the bit signal I_PUF[1] generated by the first PUF source signal 54b_11 and the first bit I_CHA[1] of the internal challenge I_CHA. The $n^{th}$ post-processing circuit 54b_2n may also include an XOR gate.

Figure 6:
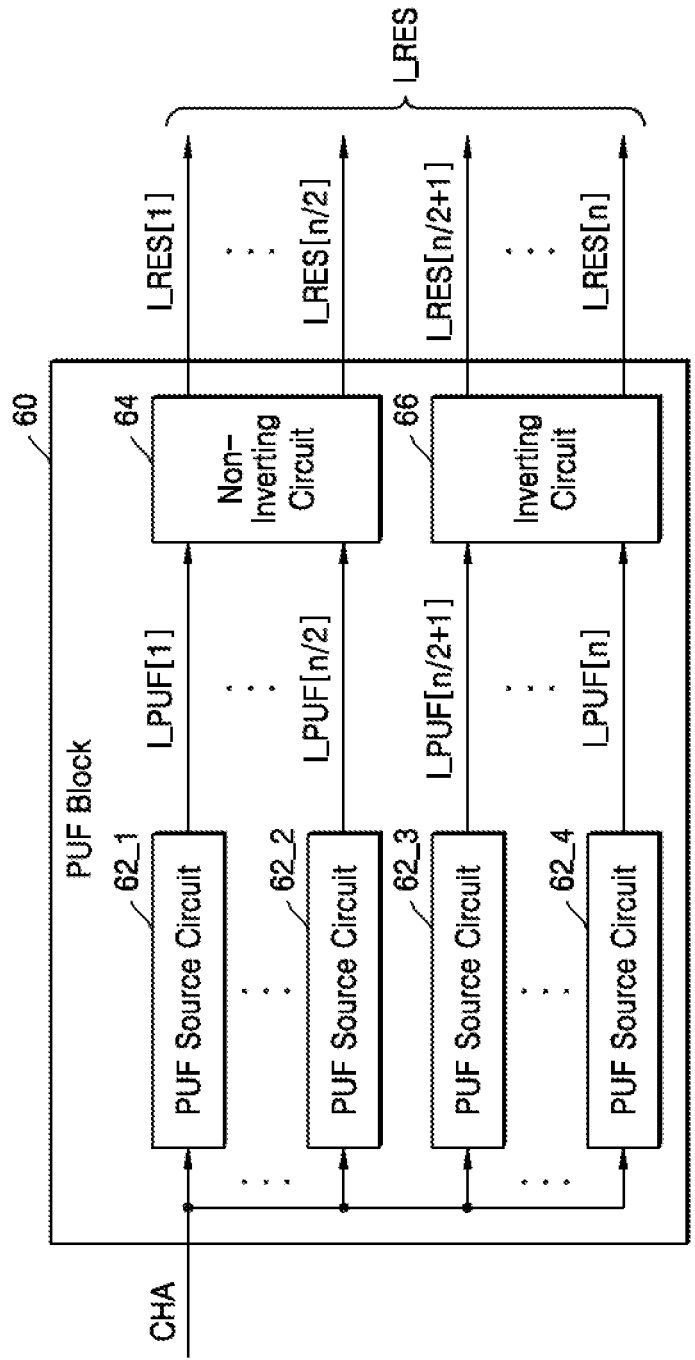
FIG. 6 is a block diagram of a physically unclonable function (PUF) block according to an example embodiment of the inventive concept.

FIG. 6 is a block diagram of a PUF block 60 according to an example embodiment of the inventive concept. As described above with reference to FIG. 1, the PUF block 60 in FIG. 6 may receive the internal challenge I_CHA generated from the challenge CHA and output the internal response I_RES. As shown in FIG. 6, the PUF block 60 may include n PUF source circuits 62_1, 62_2, 62_3, and 62_4, a non-inverting circuit 64, and an inverting circuit 66. Hereinafter, FIG. 6 will be described with reference to FIG. 1.

In an example embodiment, the PUF block 60 may invert half of the bit signals I_PUF[1] through I_PUF[n] of unique values output from the n PUF source circuits 62_1, 62_2, 62_3, and 62_4 to reduce correlation between the Hamming weight of the challenge CHA and the Hamming weight of the internal response I_RES. For example, when a PUF source circuit included in the PUF block 60 has bias 'B', a probability 'P(0)' that the PUF source circuit generates a bit signal having a value of '0' and a probability 'P1' that the PUF source circuit generates a bit signal having a value of '1' may be respectively calculated as in [Eq. 1].

$$P(0)=\tfrac{1}{2}+B, P(1)=\tfrac{1}{2}-B \qquad (\text{Eq. 1})$$

When the internal response I_RES is generated by inversing half of the bit signals I_PUF[1] through I_PUF[n] output from the n PUF source circuits 62_1, 62_2, 62_3, and 62_4, a probability '$P_{new}(0)$' that '0' occurs from the internal response I_RES and a probability '$P_{new}(1)$' that '1' occurs from the internal response I_RES may be respectively calculated as in [Eq. 2].

$$P_{new}(0)=\tfrac{1}{2}P(0)+\tfrac{1}{2}P(1), P_{new}(1)=\tfrac{1}{2}P(1)+\tfrac{1}{2}P(0) \qquad (\text{Eq. 2})$$

According to [Equation 2], the bias 'B' may be eliminated, and as a result, the correlation between the Hamming weight of the challenge CHA and the Hamming weight of the internal response I_RES may be reduced or eliminated.

Referring to FIG. 6, the non-inverting circuit 64 may generate n/2 bits I_RES[1:n/2] of the internal response I_RES by non-inversing bit signals of n/2 bit output by n/2 of PUF source circuits 62_1, 62_2, and the like, whereas the inverting circuit 66 may generate remaining n/2 bits I_RES [n/2+1:n] of the internal response I_RES by inversing bit signals I_PUF[n/2+1:n] of n/2 bits output by the n/2 PUF source circuits 62_3, 62_4, and the like.

In some embodiments, the non-inverting circuit 64 and the inverting circuit 66 may have a same structure. Since some cyber-attacks are based on analyzing the power consumed by the integrated circuit 1, a substantially constant power may be independently consumed for values of n-bit bit signals I_PUF[1:n] generated by the n PUF source circuits 62_1, 62_2, 62_3, and 62_4. The constant power level may be achieved using the non-inverting circuit 64, which may have a structure identical to that of the inverting circuit 66, instead of outputting the n/2-bit bit signals I_PUF[1:n/2] directly as the n/2-bit I_RES[1:n/2] of the internal response I_RES. For example, the non-inverting circuit 64 may include n/2 XOR gates each having an input to which '0' is applied, and the inverting circuit 66 may include n/2 XOR gates each having an input to which 'M' is applied.

In FIG. 6, the n PUF source circuits 62_1, 62_2, 62_3, 62_4, and the like are shown as receiving the challenge CHA. However, in some embodiments, as described above with reference to FIG. 5A, the n PUF source circuits 62_1, 62_2, 62_3, 62_4, and the like may also receive the internal challenge I_CHA generated by applying the non-linear function to the challenge CHA. Furthermore, in some embodiments, as described above with reference to FIG. 5B, the PUF block 60 may further include n post-processing circuits, and the n post-processing circuits may generate n-bit signals by processing the n-bit signals I_PUF[1:n] generated independently from the challenge CHA by the n PUF source circuits 62_1, 62_2, 62_3, 62_4 and the challenge CHA. By doing so, the non-inverting circuit 64 may generate n/2 bits I_RES[1:n/2] of the internal response I_RES by non-inversing n/2 bit signals generated by n/2 post-processing circuits from among the n post-processing circuits, whereas the inverting circuit 66 may generate remaining n/2 bits I_RES[n/2+1:n] of the internal response I_RES by inversing n/2 bit signals generated by remaining n/2 processing circuits.

Figure 7:
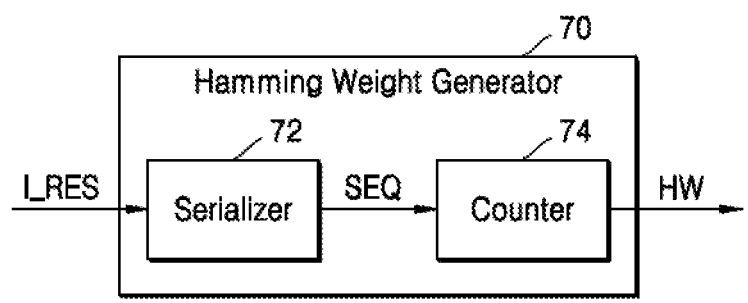
FIG. 7 is a block diagram of a Hamming weight generator according to an example embodiment of the inventive concept.

FIG. 7 is a block diagram of a Hamming weight generator 70 according to an example embodiment of the inventive concept. As described above with reference to FIG. 1, the Hamming weight generator 70 may receive the internal response I_RES of n bits and generate the Hamming weight of the internal response I_RES. As shown in FIG. 7, the Hamming weight generator 70 may include a serializer 72 and a counter 74, and hereinafter, FIG. 7 will be described with reference to FIG. 1.

The Hamming weight generator 70 with reduced power and size may be used to generate the Hamming weight HW of the internal response I_RES. For example, from among devices for Internet of Things (IoT), a device using an extremely small power and size may include the integrated circuit 1 of FIG. 1. Therefore, the Hamming weight generator 70 may, instead of summing up the bits of the internal response I_RES, generate the Hamming weight HW by serializing the internal responses I_RES and counting the serialized signals, as be described later.

Referring to FIG. 7, the serializer 72 may serialize the internal response I_RES of n bits to generate a pulse sequence SEQ. By doing so, as described later with reference to FIG. 9, the pulse sequence SEQ may include a series of pulses according to a bit of the internal response I_RES. The serializer 72 may have a random micro-structure for serializing the internal structure I_RES, and an example of the serializer 72 will be described later with reference to FIG. 8. The counter 74 may receive the pulse sequence SEQ from the serializer 72 and count pulses of the pulse sequence SEQ to output a Hamming weight WH. The counter 74 may have a random micro-structure for counting the pulses of the pulse sequence SEQ and may, in some embodiments, include an asynchronous counter. By serializing the internal responses, I_RES and using the asynchronous counter. For example, in a ripple counter, clock signals may be omitted, an area may be more reduced than using a full adder, and a stable count value may be generated when an unstable internal response I_RES is output from the PUF block 10.

Figure 8:
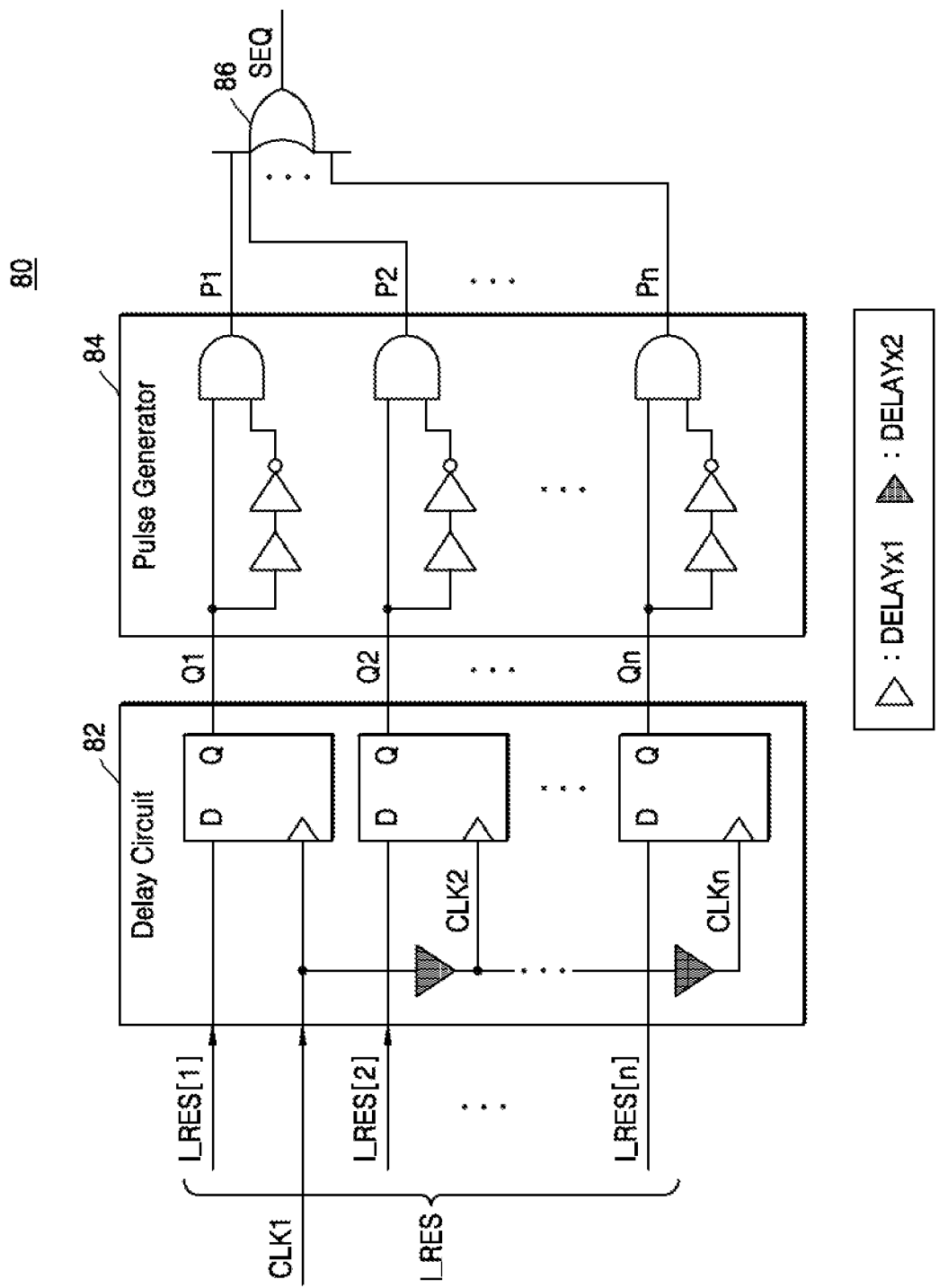
FIG. 8 is a block diagram of a serializer according to an example embodiment of the inventive concept.
Figure 9:
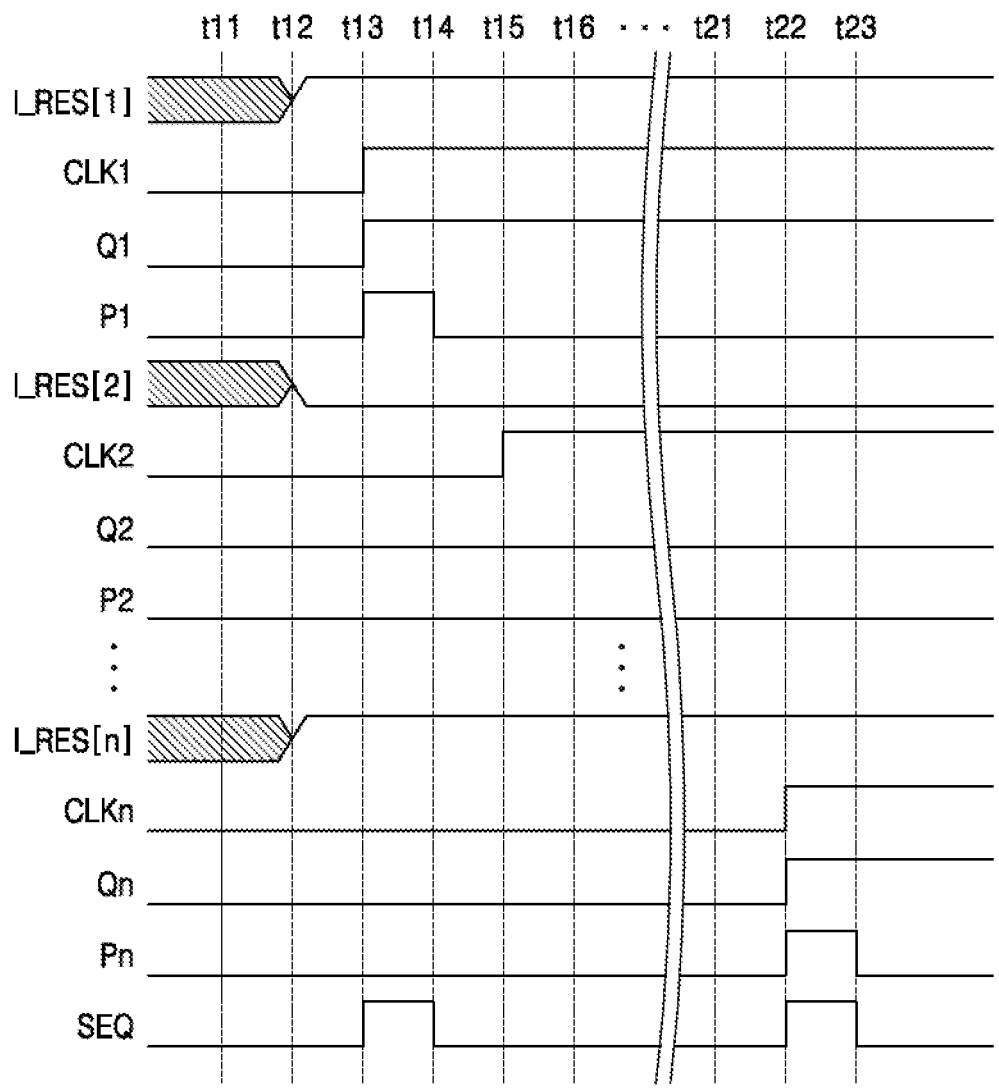
FIG. 9 is a timing diagram of an example of an operation of a serializer according to an example embodiment of the inventive concept.

FIG. 8 is a block diagram of a serializer 80 according to an example embodiment of the inventive concept, and FIG. 9 is a timing diagram of an example of an operation of the serializer 80 according to an example embodiment of the inventive concept. As described above with reference to FIG. 7, the serializer 80 may serialize an internal response I_RES of n bits to generate a pulse sequence SEQ. As shown in FIG. 8, the serializer 80 may include a delay circuit 82, a pulse generator 84, and a merger circuit 86.

The delay circuit 82 may differently delay the n bits of the internal response I_RES. For example, the delay circuit 82 may include n flip-flops mutually connected and (n−1) delay elements, as shown in FIG. 8. (n−1) clock signals CLK2 through CLKn, which are sequentially delayed from the first clock signal CLK1, may be generated by (n−1) delay elements. Accordingly, the first through the n$^{th}$ output signals Q1 through Qn of the n flip-flops may respectively have n-bit values of internal responses I_RES at time points retarded by multiples of retardation provided from one retardation element.

Referring to FIG. 9, at time t11, the n flip-flops included in the delay circuit 82 may be reset, and thus, the first through n$^{th}$ output signals Q1 through Qn may have a low level value, that is, a value of '0'. At time t12, an internal response signal I_RES may be generated from the PUF block 10, and in the example of FIG. 9, the first bit I_RES[1] and the n$^{th}$ bit I_RES[n] of the internal response I_RES may have a high level value, that is, a value of '1', whereas the second bit I_RES[2] of the internal response I_RES may have a value of '0'.

At time t13, the first clock signal CLK1 may be transited from '0' to '1'. Based on the value '1' of the first bit I_RES[1] of the internal response I_RES, the first output signal Q1 may be transited from '0' to '1'. At time t16, a second clock signal CLK, delayed from the clock signal CLK1 based on the delay element included in the delay circuit 82, may be transited from '0' to '1'. Accordingly, a second output signal Q2 may be maintained as '0' based on a value '0' of the second bit I_RES[2] of the internal response I_RES. Similarly, at time t22, the n$^{th}$ clock signal CLKn may be transited from '0' to '1'. Accordingly, the n$^{th}$ output signal may be shifted from '0' to '1' due to a value '1' of the n$^{th}$ bit I_RES[n] of the internal response I_RES.

Referring back to FIG. 8, the pulse generator 84 may receive the first through n$^{th}$ output signals Q1 through Qn from the delay circuit 82 and generate first through n$^{th}$ pulse signals P1 through Pn. In some embodiments, the pulse generator 84 may generate a pulse signal (for example, a pulse signal P1) that includes a pulse activated for a certain period of time in response to a positive edge of an output signal (for example, the output signal Q1). For example, as shown in FIG. 8, the pulse generator 84 may include n delay elements, n inverters, and n AND gates. Accordingly, when the positive edge occurs in the output signal (for example, the output signal Q1), a pulse signal (for example, the pulse signal P1) including a pulse that has an activation pulse width corresponding to delay provided by the delay element of the pulse generator 84. In some embodiments, a delay element included in the pulse generator 84 may provide less delay than that of the delay element included in the delay circuit 82. For example, as shown in FIG. 8, the delay element included in the pulse generator 84 may provide delay corresponding to half the delay provided by the delay element included in the delay circuit 82.

Referring to FIG. 9, the positive edge of the first output signal Q1 may occur at time t13, and accordingly, the first pulse signal P1 may have a pulse that is activated from the time point t13 to time point t14. At time t15, the second output signal Q2 may be maintained as '0', and thus, a pulse may not occur in the second pulse signal P2. Additionally, a positive edge of the n$^{th}$ output signal Qn may occur at time t22, and accordingly, the n$^{th}$ pulse signal Pn may have a pulse activated from time t22 to point t23.

Referring back to FIG. 8, the merger circuit 86 may generate the pulse sequence SEQ by merging tire first through n$^{th}$ pulse signals P1 through Pn provided by the pulse generator 84. For example, as shown in FIG. 8, the merger circuit 86 may generate the pulse sequence SEQ by performing an OR operation on the first through n$^{th}$ pulse signals P1 through Pn. Accordingly, as shown in FIG. 9, the pulse sequence may have a pulse activated from the time 113 to the time t14 based on the first pulse signal P1 and a pulse activated from time t22 to time t23 based on the n$^{th}$ pulse signal Pn. As described above with reference to FIG. 7, the pulse sequence SEQ may be provided to the counter 74, and the counter 74 may output the Hamming weight WH by counting the pulses included in the pulse sequence SEQ.

Figure 10:
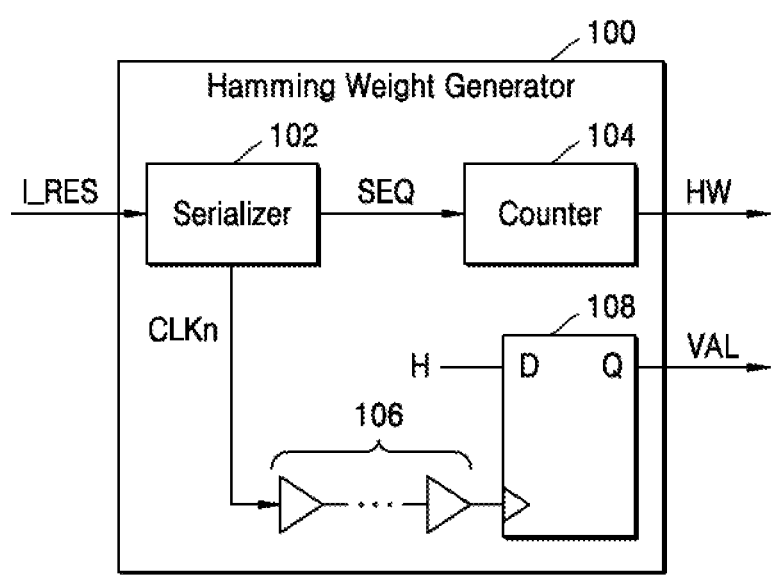
FIG. 10 is a block diagram of a Hamming weight generator according to an example embodiment of the inventive concept.

FIG. 10 is a block diagram of a Hamming weight generator 100 according to an example embodiment of the inventive concept. More particularly, FIG. 10 shows a Hamming weight generator 100 further generating a valid signal VAL that indicates a time point at which a valid Hamming weight HW is output. As shown in FIG. 10, the Hamming weight generator 100 may, similarly to the Hamming weight generator 70 of FIG. 7, include a serializer 102 and a counter 104, and may further include a delay chain 106 and a flip-flop 108. Hereinafter, FIG. 10 will be described with reference to FIGS. 7 through 9, and from descriptions of FIG. 10, repeated descriptions will be omitted.

Referring to FIG. 10, the serializer 102 may generate a pulse sequence SEQ from the internal response I_RES, and the counter 104 may count pulses of the pulse sequence SEQ to generate the Hamming weight HW. Additionally, the serializer 102 may output the pulse sequence SEQ and further output a delayed clock signal. For example, as shown in FIG. 10, the serializer 102 may further output an n$^{th}$ clock signal CLKn as the delayed clock signal. As described above with reference to FIGS. 8 and 9, the n$^{th}$ clock signal CLK may correspond to a clock signal that is delayed from the first clock signal, as the first clock signal CLK1 passes through n−1 delay elements. The n$^{th}$ clock signal CLK may have a positive edge at a time point when a pulse of the n$^{th}$ bit I_RES[n] of the internal response I_RES occurs (or does not occurs). That is, the n$^{th}$ clock signal CLKn may indicate a timing of a last pulse of the pulse sequence SEQ.

The delay chain 106 may include at least one serially connected delay element and may provide, to the flip-flop 108, a clock signal generated by delaying the n$^{th}$ clock signal CLKn. In some embodiments, the delay provided by the delay chain 106 may correspond to a time period consumed for the counter 104 to update the Hamming weight HW by counting the pulse of the pulse sequence SEQ. The flip-flop 108 may have a data input D to which a high level H is applied and may be reset in advance (for example, at the time t11 in FIG. 9). Accordingly, the flip-flop 108 may generate a valid signal VAL that is activated as a high level at a time point when the counter 104 outputs a valid Hamming weight HW, that is, the Hamming weight HW of the internal response I_RES.

Figure 11A:
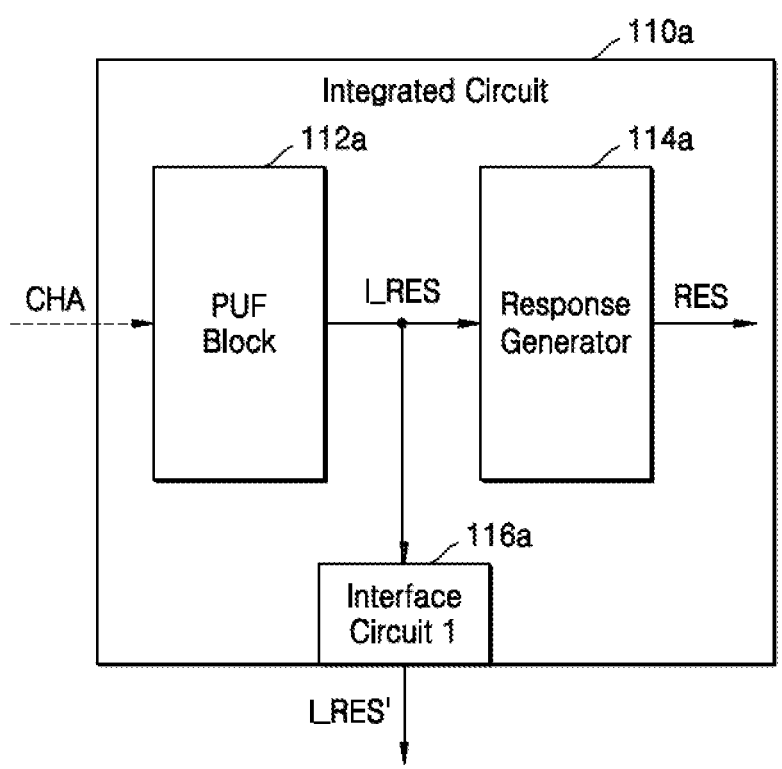
FIGS. 11A and 11B are block diagrams respectively showing integrated circuits according to example embodiments of the inventive concept.
Figure 11B:
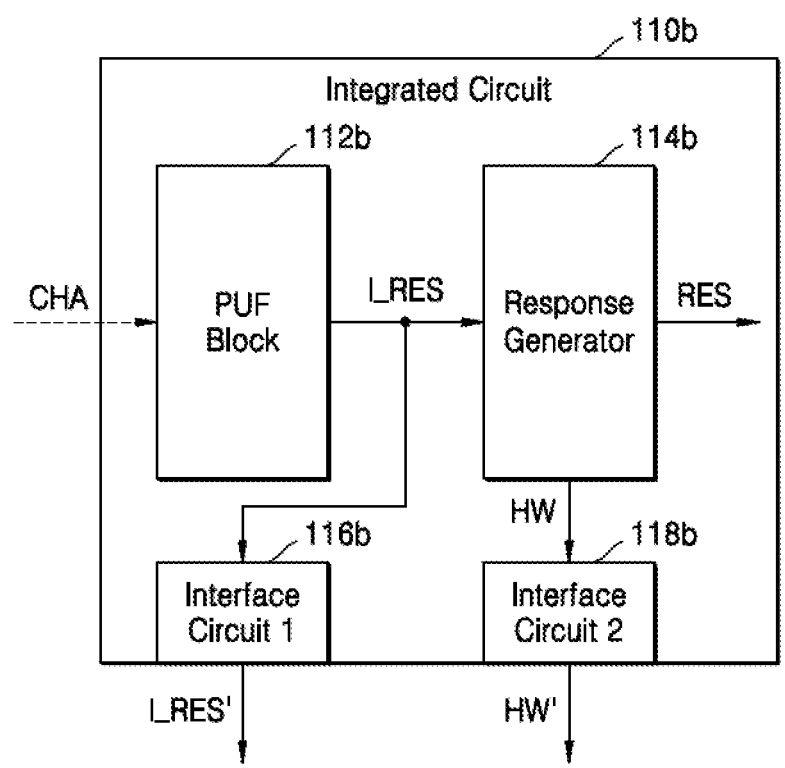

FIGS. 11A through 11B are block diagrams respectively showing integrated circuits 110a and 110b according to example embodiments of the inventive concept. More particularly, FIGS. 11A and 11B show examples of an integrated circuit including an interface circuit that is enabled in an enrollment phase. Hereinafter, from among descriptions of FIGS. 11A and 11B, repeated descriptions will be omitted.

Referring to FIG. 11A, the integrated circuit 110a may include a PUF block 112a, a response generator 114a, and a first interface circuit 116a. The PUF block 112a may generate an internal response I_RES in response to the challenge CHA (or I_CHA in FIG. 5), and the response generator 114a may generate a response RES based on the Hamming weight HW of the internal response I_RES.

The first interface circuit 116a may provide the internal response I_RES to the outside of the integrated circuit 110a in the enrollment phase of the integrated circuit 110a. In some embodiments, the enrollment phase may be included in a process of manufacturing the integrated circuit 110a. Information (for example, I_RES) provided by the integrated circuit 110a in response to the challenge CHA in the enrollment phase may be stored as information for authenticating the integrated circuit 110a. For example, the first interface circuit 116a may receive the internal response I_RES and may output a signal I_RES' including the internal response I_RES to outside. An authenticated entity such as a manufacturer of the integrated circuit 110a, may collect the internal responses I_RES based on the signal I_RES' provided from the integrated circuit 110a and may securely store information for authenticating the integrated circuit 110a based on the challenges provided from the integrated circuit 110a and the collected internal responses. The information for authenticating the integrated circuit 110a may be used for authenticating the integrated circuit 100a or a device including the integrated circuit 100a after the integrated circuit 100a is released on the market.

To protect the internal responses I_RES front attack, the first interface circuit 116 may be enabled in the enrollment phase and be disabled after the enrollment phase is completed. The first interface circuit 116a that is enabled may normally output the signal I_RES', including the internal response I_RES. By contrast, the first interface circuit 116a that is disabled may not output the signal I_RES' including the internal response I_RES or output a signal I_RES' including information irrelevant with the internal response I_RES. In some embodiments, the first interface circuit 116a may be irreversibly disabled. For example, the first interface circuit 116a may include at least one fuse, and as the at least one fuse is fused after the enrollment phase is completed, the first interface circuit 116a may be disabled.

Referring to FIG. 11B, the integrated circuit 110b may include a PUF block 112b, a response generator 114b, a first interface circuit 116b, and a second interface circuit 118b. The PUF block 112b may generate the internal response I_RES in response to the challenge CHA (or the internal challenge I_CHA in FIG. 5), and the response generator 114b may generate a response RES based on a Hamming weight of the internal response I_RES. Compared to FIG. 11A, the response generator 114b of the FIG. 11B may output a Hamming weight HW. Additionally, the first interface circuit 116b may be enabled in the enrollment phase, similarly to the first interface circuit 116a of FIG. 11a, and may output a signal I_RES' including ail internal response I_RES.

The second interface circuit 118b may provide the Hamming weight HW to outside of the integrated circuit 110b in the enrollment phase of the integrated circuit 110b. For example, as shown in FIG. 11B, the second interface circuit 118b may receive the Hamming weight HW from the response generator 114b and output a signal HW' including the Hamming weight HW to outside. An authenticated entity, such as a manufacturer of the integrated circuit 100b, may collect the internal responses I_RES in the enrollment phase, and the Hamming weights HW based on the signals I_RES' and HW' provided from the integrated circuit 110b. Similarly to the description with reference to FIG. 11A, the first interface circuit 116b and the second interface circuit 118b may be enabled in the enrollment phase and be disabled after the enrollment phase is completed. In some embodiments, the first interface circuit 116b included in the integrated circuit 110b may also be omitted.

Figure 12A:
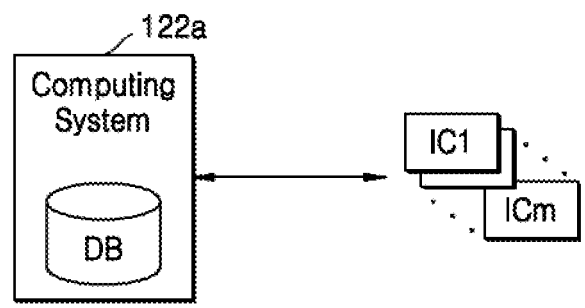
FIGS. 12A and 12B are each a block diagram showing a circumstance in which an integrated circuit is used according to example embodiments of the inventive concept.
Figure 12B:
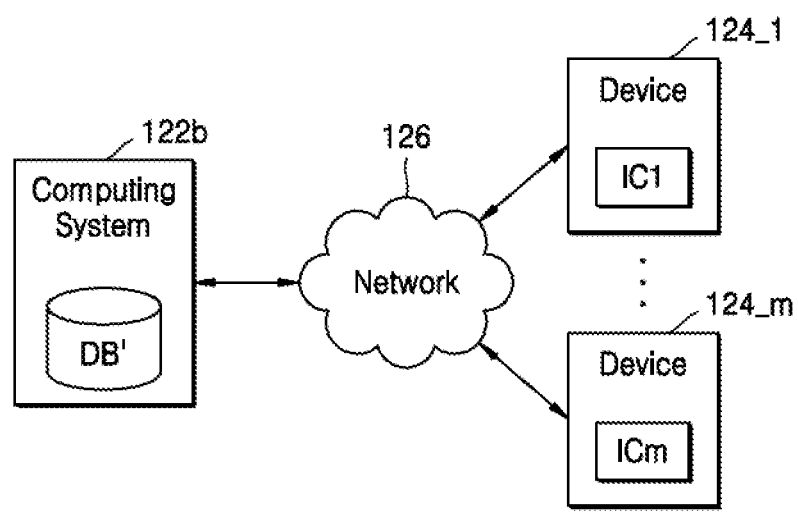

FIGS. 12A and 12B are each a block diagram showing a circumstance in which integrated circuits IC1 through ICm are used according to example embodiments of the inventive concept. Particularly, FIG. 12A shows a circumstance in which integrated circuits IC1 through ICm are used in the enrollment phase. FIG. 12B shows a circumstance in which the integrated circuits are used in the authentication phase.

Referring to FIG. 12, an authenticated entity, such as a computing system 122a operated by a manufacturer of integrated circuits IC1 through ICm, may communicate with each of the integrated circuits IC1 and ICm, where m is an integer greater than 1. For example, the computing system 122a may provide a plurality of challenges to a first integrated circuit IC1 and obtain, from the first integrated circuit IC1, information corresponding to each of the plurality of challenges, for example, the internal response I_RES and/or the Hamming weight HW. The computing system 122a may include a database including the plurality of challenges provided to the first integrated circuit IC1 and the information obtained from the first integrated circuit IC1. For example, the database DB may store a plurality of pairs of challenge-internal response or a plurality of pairs of challenge-Hamming weight. In some embodiments, the database DB, described later with reference to FIG. 14C, may include a model trained by the plurality of challenges provided to the first integrated circuit IC1 and the information obtained from the first integrated circuit IC1.

Referring to FIG. 12, the authenticated entity, for example, the manufacturer of the integrated circuits IC1 through ICm or a computing system 122b operated by a manufacturer of devices 124_1 through 124_m respectively including the integrated circuits IC1 through ICm, who is an authenticated user of the integrated circuits IC1 through ICm, may communicate with the devices 124_1 through 124_m through a network 126. The network 126 may include an arbitrary network, and as non-limiting examples, may include a cellular network, Local Area Network (LAN), Wireless Local Area Network (WLAN), and the like. Additionally, the computing system 122b and the devices 124_1 through 124_m may communicate through wired and/or wireless communication.

The computing system 122b may include a database DB'. The database DB' may be identical to the database DB of FIG. 12A and include data generated based on the database DB of FIG. 12A. The computing system 122b may authenticate the devices 124_1 through 124_m based on the database DB'. For example, the computing system 122b may generate a challenge based on the database DB' and provide the challenge to a first device 124_1 through the network 126. The computing system 122b may receive the response generated by the first integrated circuit IC1 included in the first device 124_1 through the network 126 and may authenticate the first device 124_1 by evaluating the response based on the database DB'.

Figure 13:
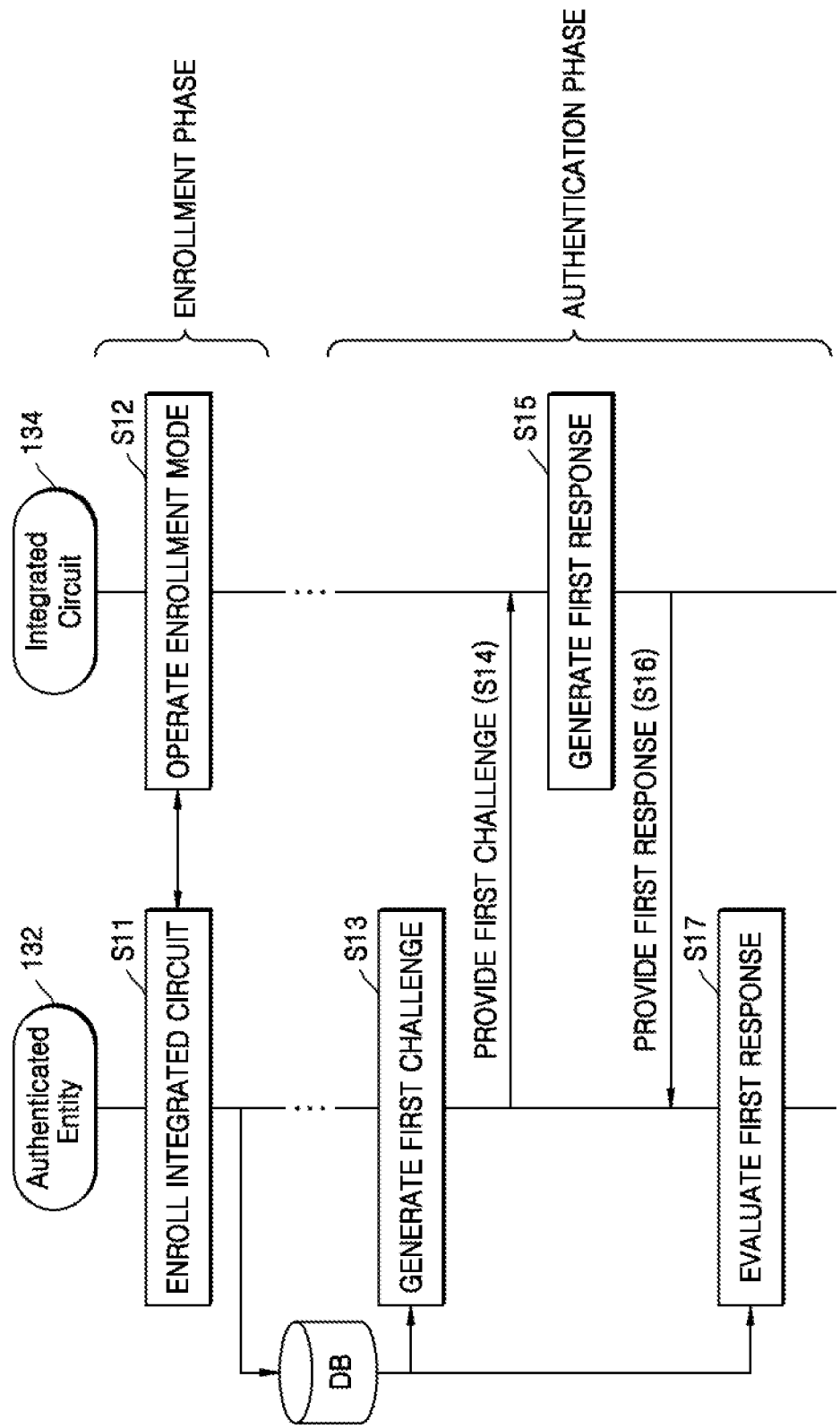
FIG. 13 is a flowchart of a method of using an integrated circuit for a challenge-response physically unclonable function according to time, according to an example embodiment of the inventive concept.

FIG. 13 is a flowchart of a method of using an integrated circuit 134 for a challenge-response PUF (or a challenge-response type PUF), according to an example embodiment of the inventive concept. More particularly, FIG. 13 shows the method of enrolling and authenticating the integrated circuit 134, performed by the authenticated entity 132, for the challenge-response PUF. In some embodiments, the authenticated entity 132 of FIG. 13 may manage the computing systems 122a and 122b of FIGS. 12A and 12B, and in FIG. 13, operations S11, S13, S14, and S17 of the authenticated entity 132 may be performed by the computing systems 122a and 122b of FIGS. 12A and 12B. Hereinafter, in the description of FIG. 13, it is assumed that the integrated circuit 134 includes the components of the integrated circuit 1 of FIG. 1, and FIG. 13 will be described with reference to FIG. 1.

In operation S11, the authenticated entity 132 may enroll the integrated circuit 134. Furthermore, in operation S12, the integrated circuit 134 may operate in tire enrollment phase. For example, the authenticated entity 132 may provide a challenge to the integrated circuit 134, and the integrated circuit 134 may, as described above with reference to FIGS. 11A and 11B, provide the information corresponding to the challenge, for example, the internal response and/or the Hamming weight, to the authenticated entity 132 in the enrollment phase. The authenticated entity 132 may generate a database DB based on the challenge provided from the integrated circuit 134 and the information obtained from the integrated circuit 134.

In operation S13, the authenticated entity 132 may generate a first challenge. In some embodiments, the authenticated entity 132 may generate the first challenge that may be estimated by a response, based on the database DB. For example, the authenticated entity 132 may, based on the database DB, generate a first challenge, for which an internal response I_RES and/or Hamming weight HW corresponding to die first challenge I_RES may be estimated.

In some embodiments, the authenticated entity 132 may generate the first challenge by excluding a challenge that induces a response which may include errors. For example, as described above with reference to FIG. 4, the Hamming weight generated by the integrated circuit 134 may include errors in some ranges. Therefore, the authenticated entity 132 may generate a weight, which corresponds to a range other than the range of the Hamming weight that may include the errors, as a first weight. For example, referring to the example of FIG. 4, the authenticated entity 132 may generate a challenge, which corresponds to a Hamming weight less than or equal to the first reference STD1 or equal to or greater than the second reference STD2, as the first challenge. Then, in operation S14, the authenticated entity 132 may provide the first challenge to the integrated circuit 134. For example, the authenticated entity 132 may provide the first challenge to the integrated circuit 134 through a network (for example, the network 126 in FIG. 12B).

In operation S15, the integrated circuit 134 may generate a first response. For example, the integrated circuit 134 may generate the internal response I_RES corresponding to the first challenge, based on the PUF, and generate a Hamming weight HW of the internal response I_RES. Additionally, the integrated circuit 134 may compare the Hamming weight HW with at least one reference and generate the first response based on a result of the comparison. Then, in operation S16, the integrated circuit 134 may provide the first response to the authenticated entity 132.

In operation S17, the authenticated entity 132 may evaluate the first response. For example, the authenticated entity 132 may estimate a response corresponding to the first challenge generated in operation S13 and evaluate the first response by comparing the estimated response with the first response. More particularly, the authenticated entity 132 may obtain a Hamming weight corresponding to the first challenge and estimate the response according to the Hamming weight. The authenticated entity 132 may determine that the authentication of the integrated circuit 134 is successful when the estimated response matches the first response. Otherwise, the authenticated entity 132 may determine that the authentication of the integrated circuit 134 failed. Examples of operations of estimating Hamming weights and/or responses performed by the authenticated entity 132 to generate the first challenge or evaluate the first response will be described with reference to FIGS. 14A, 14B, and 14C.

Figure 14A:
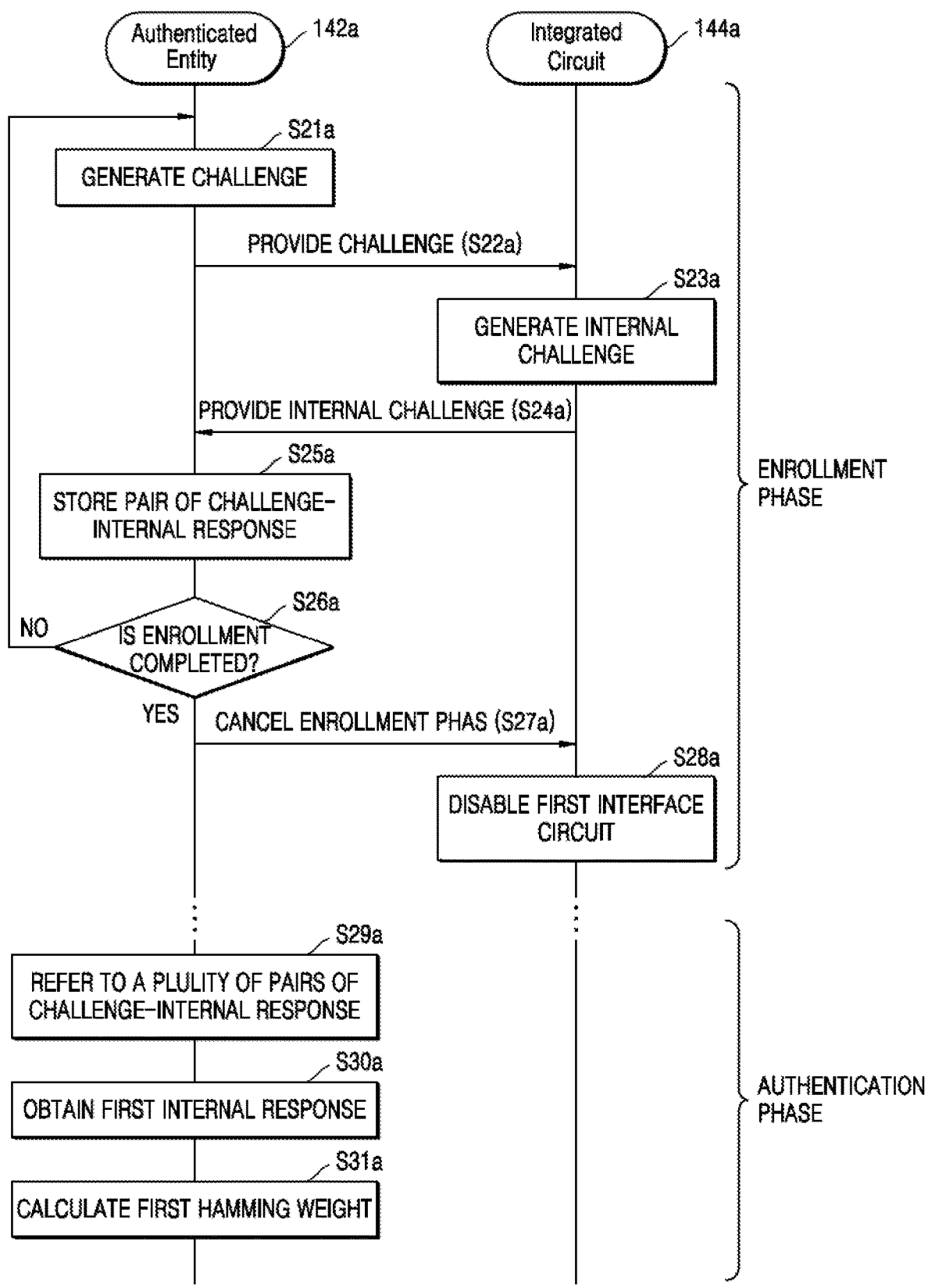
FIGS. 14A, 14B, and 14C are flowcharts showing examples of a method of using an integrated circuit for a challenge-response physically unclonable function, according to example embodiments of the inventive concept.
Figure 14B:
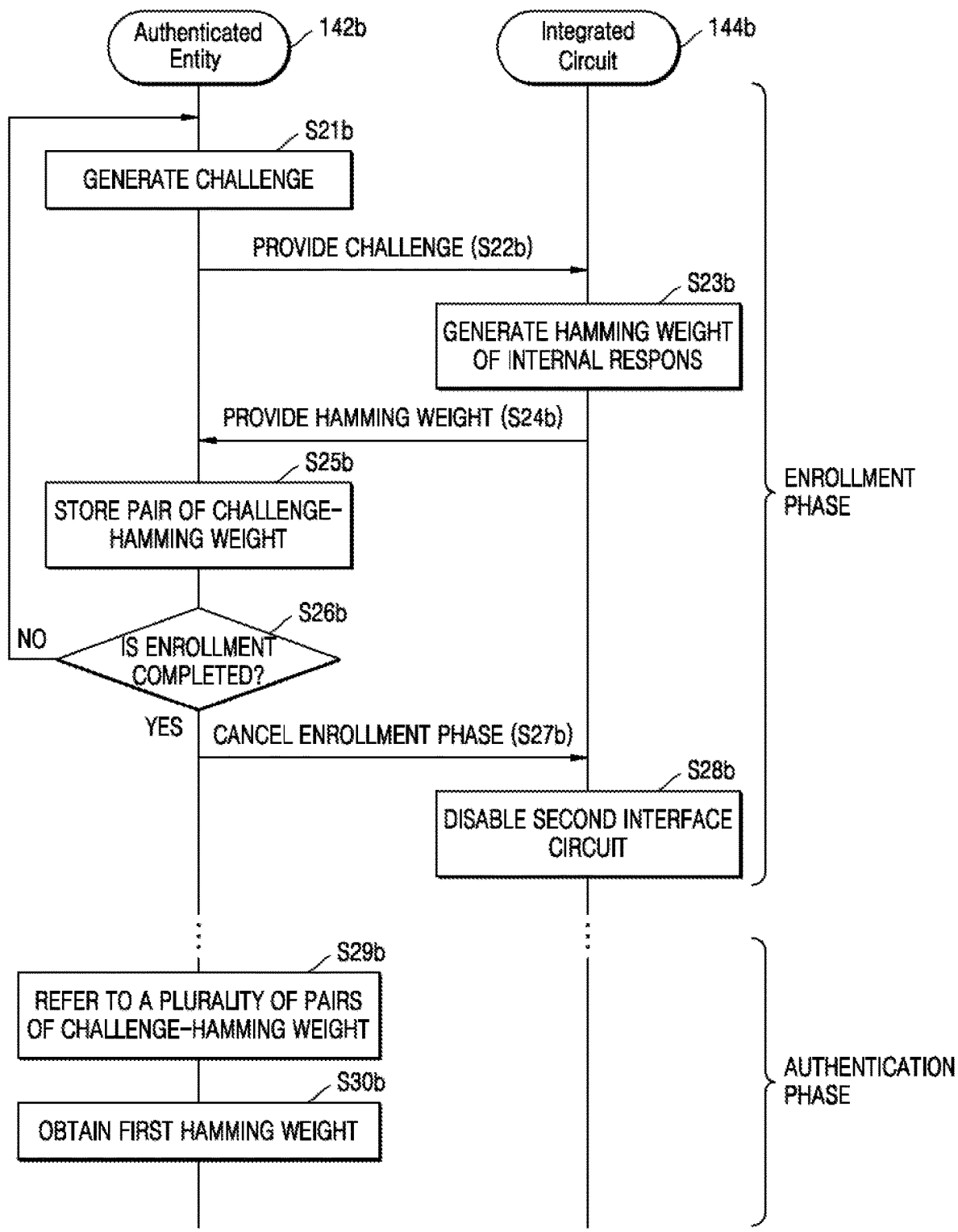
Figure 14C:
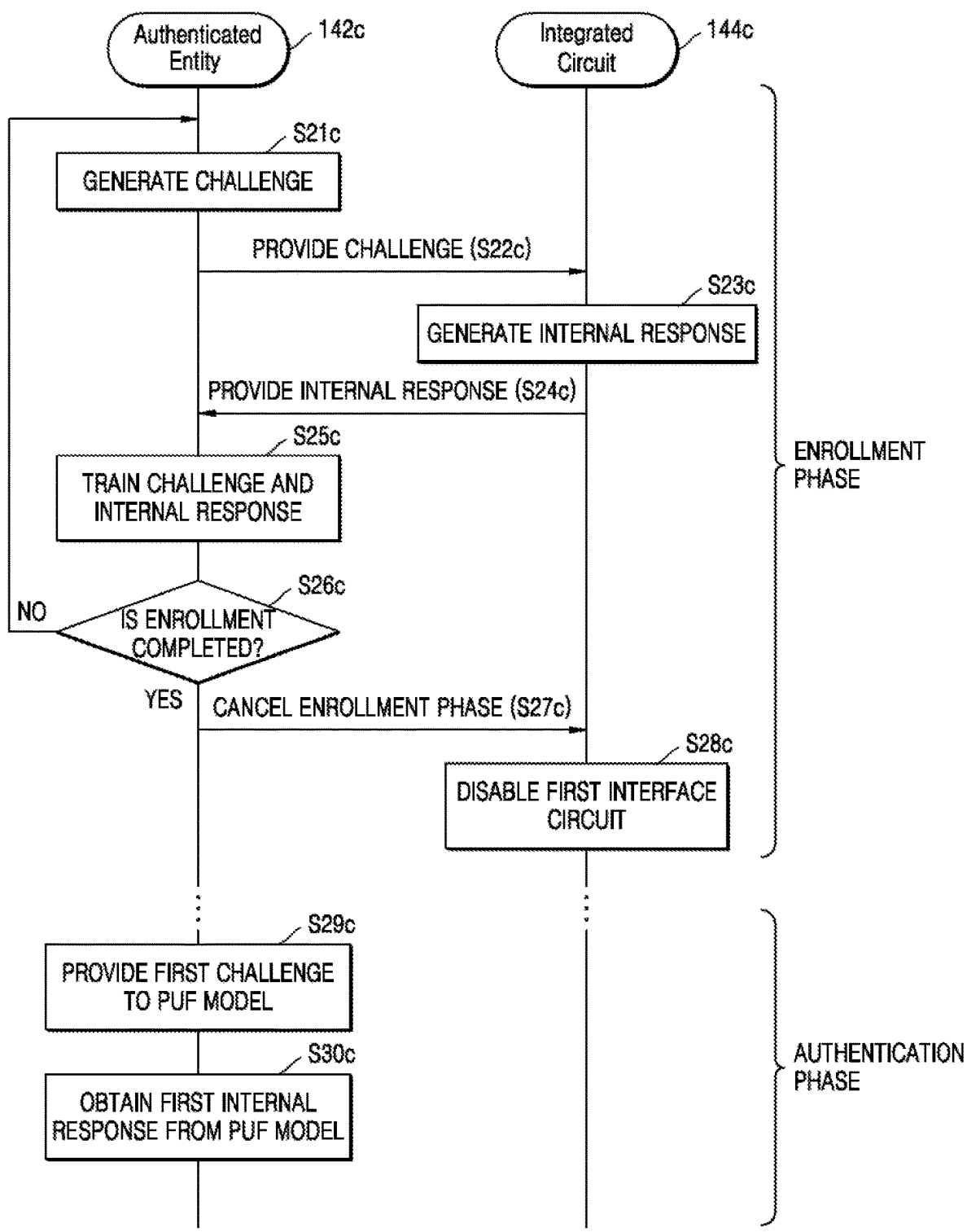

FIGS. 14A, 14B, and 14C are flowcharts of examples of a method of using an integrated circuit 134 for a challenge-response PUF, according to example embodiments of die inventive concept. More particularly, FIGS. 14A, 14B, and 14C show examples of the enrollment phase and the authentication phase for authenticating the integrated circuit 144a. Similarly to the example of FIG. 13, in some embodiments, authenticated entities 142a, 14b, and 142c shown in FIGS. 14A, 14B, and 14C may manage the computing systems 122a and 122b of FIGS. 12A and 12B, and in FIGS. 14A, 14B, and 14C, operations of the authenticated entities 142a, 142b, and 142c may be performed by the computing systems 122a and 122b of FIGS. 12A and 12B. Hereinafter, in the descriptions of FIGS. 14A, 14B, and 14C, it is assumed that the enrollment phase and the authentication phase are performed by the same entity, and repeated descriptions will be omitted.

Referring to FIG. 14A, in some embodiments, the authenticated entity 142a may store internal responses provided by the integrated circuit 144a in the enrollment phase and calculate a Hamming weight based on the stored internal responses in the authentication phase. As shown in FIG. 14A, operations S21a through S28a may be performed in the enrollment phase and operations S29a through S31a may performed in the authentication phase.

In operation S21a, the authenticated entity 142a may generate a challenge. For example, when operation S21a is preformed after operation S26a, the authenticated entity 142 may generate a challenge different from the challenge that is generated in operation S21a. Then, in operation S22a, the authenticated entity 142 may provide the challenge generated in operation S21a to the integrated circuit 144a.

In operation S23a, the integrated circuit 144a may generate an internal response based on the challenge. For example, the integrated circuit 144a may include a PUF block (for example, the PUF block 10 in FIG. 1), and the PUF block may generate an internal response, in response to the challenge or an internal challenge that is generated from the challenge. Then, in operation S24a, the integrated circuit 144a may provide the internal response generated in operation S23a to the authenticated entity 142a. For example, as described above with reference to FIG. 11A, the integrated circuit 144a may provide the internal response to the authenticated entity 142 through the first interface circuit (for example, the interlace circuit 116a in FIG. 11) enabled in the enrollment phase.

In operation S25a, the authenticated entity 142a may store a pair of challenge-internal response. More particularly, the response generated in operation S21a and the internal response provided in operation S24a may be mutually mapped by the authenticated entity 142a, and the authenticated entity 142a may store a mutually-mapped pair of challenge-internal response in a repository.

In operation S26a, the authenticated entity 142a may determine whether the authentication is completed. In some embodiments, the authenticated entity 142a may repeatedly generate multiple available challenges. Additionally, in some embodiments, the authenticated entity 142a may also repeatedly generate some of the available challenges. As shown in FIG. 14, operation S21a may be subsequently performed when the enrollment is not completed, whereas operation S27a may be subsequently performed when the enrollment is completed.

In operation S27a, the authenticated entity 142a may release the enrollment phase. For example, the authenticated entity 142a may provide a signal instructing release of the enrollment phase to the integrated circuit 144a. Then, in operation S28a, the integrated circuit 144a may disable the first interface circuit in response to the release of the enrollment phase. Accordingly, the output of the internal response from the integrated circuit 144a may be prohibited.

In operations S29a through S31a, the authenticated entity 142 may estimate a first Hamming weight corresponding to the first challenge provided to the integrated circuit 144a for authentication of the integrated circuit 144a. In some embodiments, the authenticated entity 142a may estimate the First Hamming weight to generate the first challenge. For example, the audienticated entity 142a may estimate the first Hamming weight to determine whether the first Hamming weight of the first challenge is in a range that may include errors as described above with reference to FIG. 4. In some embodiments, the authenticated entity 142a may also estimate the first Hamming weight to evaluate the first response provided from the integrated circuit 144a.

In operation S29a, the authenticated entity 142a may refer to a plurality of pairs of challenge-internal response. As described above, pairs of challenge-internal response may be collected in operations S21a through S26a of the enrollment phase, and the authenticated entity 142a may refer to the collected pairs of challenge-internal response in the authentication phase. In operation S30a, the authenticated entity 142 may obtain a first internal response. The authenticated entity 142 may obtain the first internal response corresponding to the first challenge based on the plurality of pairs of challenge-response. Accordingly, the first internal response may correspond to an internal response generated from the integrated circuit in response to the first challenge. In operation S31a, the authenticated entity 142a may calculate the first Hamming weight. For example, the authenticated entity 142a may calculate the first Hamming weight by counting the number of '1' included in the first internal response. As described above, the first Hamming weight may be used for determining the generation of the first challenge and/or evaluating the first response provided from the integrated circuit 144a.

Referring to FIG. 14B, in some embodiments, the authenticated entity 142b may store Hamming weight provided by the integrated circuit 144b in the enrollment phase, and may use a Hamming weight based on the stored Hamming weights in the authentication phase. As shown in FIG. 14B, operations S21b through S28b may be performed in the enrollment phase, and operations S29b and S30b may be performed in the authentication phase.

In operation S21b, the authenticated entity 142b may generate a challenge, and in operation S22b, the authenticated entity 142b may provide the generated challenge to the integrated circuit 144b. Then, in operation S23b, the integrated circuit 144b may generate a Hamming weight of an internal response based on die provided challenge, and in operation S24b, the integrated circuit 144b may provide the Hamming weight to the authenticated entity 142b. For example, as described above with reference to FIG. 11B, the integrated circuit 144b may provide the Hamming weight to the authenticated entity 142b through a second interface circuit (for example, the interface circuit 118b in FIG. 11B) enabled in the enrollment phase.

In operation S25b, the authenticated entity 142b may store a pair of challenge-Hamming weight. Particularly, the challenge generated in operation S21b and the Hamming weight provided in operation S24b may be mutually mapped by the authenticated entity 142b, and the authenticated entity 142b may store a mutually mapped pair of challenge-internal response in a repository. In operation S26b, the authenticated entity 142b may determine whether enrollment is completed. As shown in FIG. 14B, operation S21b may be subsequently performed when the enrollment phase is not completed, whereas operation S27b may be subsequently performed when the enrollment phase is completed. In operation S27b, the authenticated entity 142b may release the enrollment phase, and in operation S28b, the integrated circuit 144b may disable the second interface circuit in response to the release of the enrollment phase.

In operations S29b and S30b, the authenticated entity 14b may estimate the first Hamming weight corresponding to the first challenge that is provided to the integrated circuit 144b for authenticating the integrated circuit, and the estimated first Hamming weight may be variously used as described above with reference to FIG. 14A. In operation S29b, the authenticated entity 142b may refer to a plurality of pairs of challenge-Hamming weight. As described above, the pairs of challenge-Hamming weight may be collected in operations S21b through S26b in the enrollment phase, and the authenticated entity 142b may refer to the collected pairs of challenge-Hamming weight in the authentication phase. In operation S30b, the authenticated entity 142b may obtain the first Hamming weight, and the first Hamming weight may as described above with reference to FIG. 13, be used for determining whether the first challenge is generated and/or evaluating the first response provided from the integrated circuit 144b.

Referring to FIG. 14C, in some embodiments, the authenticated entity 142c may, in the enrollment phase, obtain an internal response provided by the integrated circuit 144c and generate a model which is trained by the challenge and the obtained internal response (may be referred to as a PUF model in the present specification). For example, the PUF model may be realized in the computing systems 122a and 122b of FIGS. 12A and 12B, and may be realized in another computing system communicably connected to the computing systems 122a and 122b. The authenticated entity 142c may, in the authentication phase, use the PUF model that is trained based on a plurality of challenges and internal responses in the enrollment phase. As shown in FIG. 14, operations S21c through S28c may be performed in the enrollment phase, and operations S29c and S30c may be performed in the authentication phase.

In operation S21c, the authenticated entity 142c may generate a challenge, and in operation S22c, the authenticated entity 142c may provide the generated challenge to the integrated circuit 144c. Then, in operation S23c, the integrated circuit 144c may generate an internal response based on the provided challenge, and in operation S24c, may provide the internal response to the authenticated entity 142c. For example, as described above with reference to FIG. 11A, the integrated circuit 144c may provide the internal response to the authenticated entity 142c through the first interface circuit (for example, the first interface circuit 116a in FIG. 11A) enabled in the enrollment phase.

In operation S25c, the authenticated entity 142c may be trained based on a challenge and an internal response. For example, the authenticated entity 142c may generate a PUF model that has been trained the challenge and internal response based on machine learning. Compared to the examples of FIGS. 14A and 14B, in the enrollment phase, a PUF model which has been trained by the plurality of pairs of challenge-internal response may be generated instead of storing the plurality of pairs of challenge-internal response and/or the plurality of pairs of challenge-internal Hamming weight. In operation S26c, the authenticated entity 142c may determine whether the enrollment is completed. As shown in FIG. 14C, operation S21c may be subsequently performed when the enrollment phase is not completed, whereas operation S27c may be subsequently performed when the enrollment phase is completed. In operation S27c, the authenticated entity 142c may release the enrollment phase, and in operation S28c, the integrated circuit 144c may disable the first interface circuit in response to the release of the enrollment phase.

In operations S29c and S30c, the authenticated entity 14c may obtain a first internal response corresponding to a first challenge provided to the internal circuit 144c for authentication of the integrated circuit 144c from the PUF model, and calculate a Hamming weight of the first internal response, a first Hamming weight, for various usage as described above with reference to FIG. 14A. In operation S29c, the authenticated entity 142c may provide the first challenge to the PUF model. The authenticated entity 142c may then obtain the first internal response from the PUF model in operation S30e. As described above, the PUF model in the enrollment phase has been trained based on the plurality of pairs of challenge-internal response, and accordingly, the first internal response corresponding to the first challenge may be obtained from the PUF model.

The Hamming weight calculated from the internal response is used for generating a response provided from the integrated circuit. In some embodiments, when the first response obtained from the PUF model does not precisely match the internal response generated in the integrated circuit 144c based on the first challenge, a first internal response obtained in operation S30c may be used for generating the first challenge and/or evaluating the first response. For example, the first response obtained from the PUF model may not match due to high entropy of an internal response generated by the PUF block (for example, the PUF block 10 in FIG. 1) in the integrated circuit 144.

Figure 15A:
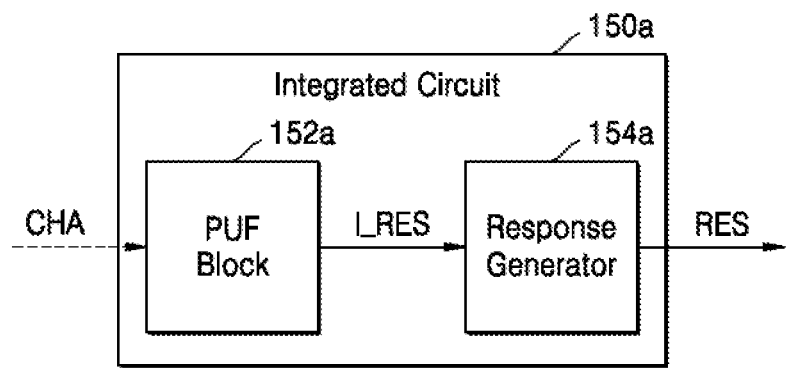
FIGS. 15A and 15B are diagrams showing examples of an integrated circuit according to example embodiments of the inventive concept.
Figure 15B:
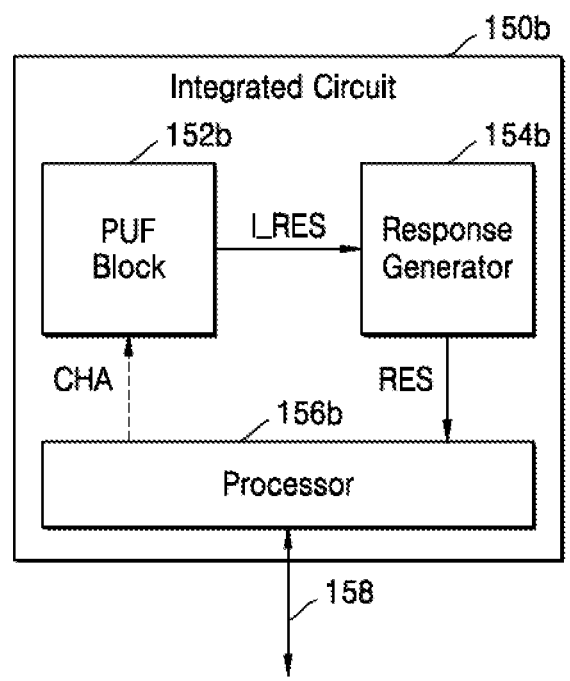

FIGS. 15A and 15B are diagrams showing examples of integrated circuits 150a and 150b, respectively, according to example embodiments of the inventive concept. As described above with reference to the drawings, the integrated circuits 150a and 150b may generate the internal response I_RES corresponding to the challenge CHA, generate the response RES based on the internal response I_RES, and by doing so, the challenge-response physically unclonable function may be available. Hereinafter, from among descriptions of FIGS. 15A and 15B, repeated descriptions will be emitted.

Referring to FIG. 15A, in some embodiments, the integrated circuit 150a may directly receive a challenge CHA provided from outside and directly output a response RES, which corresponds to the challenge CHA, to the outside. For example, the integrated circuit 150a may be used as a dedicated component used for authentication in a device including the integrated circuit 150a. As shown in FIG. 15A, the integrated circuit 150a may include a PUF block 152a and a response generator 154a, and the PUF block 152a may generate an internal response I_RES based on the challenge CHA or an internal challenge (for example, the internal challenge I_CHA in FIG. 5A) generated from the challenge CHA. The response generator 154a may calculate a Hamming weight of the internal response I_RES and output the response to outside of the integrated circuit 150a by comparing the Hamming weight with at least one reference.

Referring to FIG. 15B, in some embodiments, the integrated circuit 150b may include a function block which may perform other functions in addition to the challenge-response PUF. For example, the integrated circuit 150b may be a system-on-chip (SOC) and further include a processor 156b in addition to a PUF block 152b and a response generator 154b, as shown in FIG. 15B. In some embodiments, the processor 156b may include an arbitrary processing unit executing a series of instructions, and may also include a Field Programmable Gate array (FPGA), a hardware accelerator, and the like.

In some embodiments, the processor 156b may communicate with other devices, receive a challenge CHA, or transmit a response RES through a communication channel 158. The communication channel 158 may include a wired channel and/or a wireless channel. For example, as shown in FIG. 15B, the processor 156b may provide the challenge CHA to the PUF block 152b based on the signal received from the communication channel 158, and may also transmit the response RES, which is provided from the response generator 154b, through the communication channel 158.

While the inventive concept has been particularly shown and described with reference to embodiments thereof, it will be understood that various changes in form and details may be made therein without departing from the spirit and scope of the following claims.

What is claimed is:

1. An integrated circuit for a challenge-response physically unclonable function (PUF), the integrated circuit comprising:
   a PUF block configured to output an internal response having n bits corresponding to a challenge that requests a response, where n is an integer greater than 1;
   a response generator configured to calculate a Hamming weight of the internal response and output the response by comparing the Hamming weight with at least one reference defined based on n/2; and
   wherein the response generator is configured to generate a pulse sequence by serializing the internal response and to calculate the Hamming weight by counting the pulse sequence.

2. The integrated circuit of claim 1, wherein
   the response generator is configured to output a first value when the Hamming weight is equal to or greater than n/2 and output a second value different from the first value when the Hamming weight is less than n/2.

3. The integrated circuit of claim 1, wherein
   the response generator is configured to output a first value when the Hamming weight is less than or equal to a first reference, which is less than n/2, and output a second value different from the first value when the Hamming weight is equal to or greater than a second reference that is greater than n/2.

4. The integrated circuit of claim 3, wherein
   the response generator is configured to output the response independently from the internal response when the Hamming weight is between the first reference and the second reference.

5. The integrated circuit of claim 1, further comprising
   an internal challenge generator configured to generate an internal challenge from the challenge based on a non-linear function, and
   wherein the PUF block is configured to output the internal response based on the internal challenge.

6. The integrated circuit of claim 5, wherein
   the PUF block comprises:
   n PUF source circuits each configured to generate a bit signal of a unique value;
   a non-inverting circuit configured to output n/2 bits of the internal response by performing a non-inverting function on n/2 bit signals from among n bit signals dependent on bit signals of the n PUF source circuits; and
   an inverting circuit configured to output other n/2 bits of the internal response by inverting other n/2 bit signals from among the n bit signals dependent on the bit signals of the PUF source circuits.

7. The integrated circuit of claim 1, wherein the PUF block comprises a plurality of logic gates and is configured to generate the internal response based on threshold levels of the plurality of logic gates.

8. The integrated circuit of claim 1, wherein the response generator comprises an asynchronous counter configured to count the pulse sequence.

9. The integrated circuit of claim 1, further comprising
a first interface circuit configured to output the internal response to outside of the integrated circuit, and
the first interface circuit is configured to be disabled after an enrollment phase is completed.

10. The integrated circuit of claim 1, further comprising
a second interface circuit configured to output the Hamming weight to outside of the integrated circuit, and
the second interface circuit is configured to be disabled after an enrollment phase is completed.

11. An integrated circuit for a challenge-response physically unclonable function (PUF), the integrated circuit comprising:
a PUF block configured to output an internal response that has n bits and varies according to a challenge that requests a response, where n is an integer greater than 1;
a response generator configured to output the response based on the internal response by counting a bit unit which has a particular value corresponding to at least one bit and comparing a result of the counting with at least one reference defined based on n/2; and
wherein the response generator comprises: a serializer configured to generate a pulse sequence by serializing the internal response; a counter configured to calculate Hamming weight by counting the pulse sequence; and a comparator configured to compare an output signal of the counter with the at least one reference.

12. The integrated circuit of claim 11, wherein
the response generator is configured to output a first value when the result of the counting is equal to or greater than a probabilistic expected value of the particular value and output a second value different from the first value when the result of the counting is less than the probabilistic expected value.

13. The integrated circuit of claim 11, wherein
the response generator is configured to output a first value when the a result of the counting is less than or equal to a first reference that is less than a probabilistic expected value of the particular value and output a second value different from the first value when a Hamming weight is equal to or greater than a second reference that is greater than the probabilistic expected value.

14. The integrated circuit of claim 13, wherein the response generator is configured to independently output the response from the internal response when the result of the counting is between the first reference and the second reference.

15. The integrated circuit of claim 11, further comprising
an internal challenge generator configured to generate an internal challenge from the challenge based on a non-linear function, and
the PUF block is configured to output the internal response based on the internal challenge.

16. The integrated circuit of claim 13, wherein the PUF block comprises n PUF source circuits each configured to generate a bit signal of a unique value that varies according to the internal challenge.

17. The integrated circuit of claim 11, wherein the counter includes an asynchronous counter configured to respond to the pulse sequence.

18. A challenge-response authentication method using an integrated circuit comprising a physically unclonable function (PUF), the challenge-response authentication method comprising:
generating a first challenge, providing the first challenge to the integrated circuit;
obtaining, from the integrated circuit, a first response corresponding to the first challenge; and
evaluating the first response based on a first Hamming weight of an n-bit first internal response generated by the integrated circuit in response to the first challenge, wherein the evaluating the first response comprises comparing the first Hamming weight with at least one reference defined based on n/a; and
wherein generating a pulse sequence by serializing the internal response and to calculate the Hamming weight by counting the pulse sequence.

* * * * *